United States Patent
Nakagawa et al.

(10) Patent No.: US 7,502,907 B2
(45) Date of Patent: *Mar. 10, 2009

(54) METHOD, DEVICE AND PROGRAM FOR MANAGING VOLUME

(75) Inventors: Hirotaka Nakagawa, Fujisawa (JP);
Masayuki Yamamoto, Sagamihara (JP);
Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/808,608

(22) Filed: Jun. 12, 2007

(65) Prior Publication Data

US 2007/0245115 A1 Oct. 18, 2007

Related U.S. Application Data

(63) Continuation of application No. 10/828,286, filed on Apr. 21, 2004, now Pat. No. 7,260,699.

(30) Foreign Application Priority Data

Jan. 14, 2004 (JP) ............................. 2004-006214
Mar. 10, 2004 (JP) ............................. 2004-066548

(51) Int. Cl.
*G06F 12/00* (2006.01)
(52) U.S. Cl. ...................... 711/170; 711/114; 711/154; 711/161; 711/162; 707/204
(58) Field of Classification Search ........................ None
See application file for complete search history.

(56) References Cited

U.S. PATENT DOCUMENTS 4,310,883 A 1/1982 Clifton et al.
5,345,584 A 9/1994 Hill (Continued)

FOREIGN PATENT DOCUMENTS

JP 2003-140836 5/2003

OTHER PUBLICATIONS

Device Storage Services 2.7:, Device27_StorageServices.mof, Version 2.7.1, Apr. 22, 2003.

*Primary Examiner*—Hyung S Sough
*Assistant Examiner*—Kaushikkumar Patel
(74) *Attorney, Agent, or Firm*—Mattingly, Stanger, Malur & Brundidge, P.C.

(57) ABSTRACT

Computer systems having a plurality of storage systems could not detect addition of storage systems or configuration changes thereof and automatically redistribute existing volumes based on "hints" provided when the volumes were created. A management computer, which is connected via a network to storage systems having volumes connected via a network to a host computer and which stores data used by the host computer, keeps correspondences between levels indicating specific performances of volumes and storage system characteristics indicating performances of the storage systems. From a first storage system, a level is obtained indicating a performance of a volume of the first storage system allocated to the host computer. The storage system characteristics of the first storage system corresponding to the obtained level indicating the performance of the volume, and storage system characteristics of another storage system are referenced, and the performances of the volumes of the storage systems are compared.

8 Claims, 19 Drawing Sheets

U.S. PATENT DOCUMENTS

| | | |
|---|---|---|
| 5,835,694 A | 11/1998 | Hodges .......................... 714/6 |
| 6,230,200 B1 | 5/2001 | Forecast et al. ............. 709/226 |
| 6,389,432 B1 | 5/2002 | Pothapragada et al. |
| 6,532,535 B1 | 3/2003 | Maffezzoni et al. ............. 713/1 |
| 6,598,174 B1 | 7/2003 | Parks et al. |
| 6,625,750 B1 | 9/2003 | Duso et al. ..................... 714/11 |
| 6,766,430 B2 | 7/2004 | Arakawa et al. |
| 6,836,832 B1 | 12/2004 | Klinkner |
| 6,856,508 B2 | 2/2005 | Rabinovitz .................. 361/685 |
| 6,901,479 B2 | 5/2005 | Tomita ....................... 711/114 |
| 6,912,627 B2 | 6/2005 | Matsunami et al. ......... 711/154 |
| 6,934,826 B2 | 8/2005 | Lubbers et al. ............. 711/170 |
| 6,938,021 B2 | 8/2005 | Shear et al. ................... 705/67 |
| 2002/0133539 A1 | 9/2002 | Monday ..................... 709/203 |
| 2003/0115204 A1 | 6/2003 | Greenblatt et al. ............ 707/10 |
| 2004/0024796 A1 | 2/2004 | Takeda et al. |
| 2004/0123029 A1 | 6/2004 | Dalal et al. ................. 711/114 |
| 2004/0123180 A1 | 6/2004 | Soejima et al. |
| 2004/0181641 A1 | 9/2004 | Nguyen et al. |
| 2004/0193827 A1 | 9/2004 | Mogi et al. ................. 711/170 |
| 2004/0243699 A1 | 12/2004 | Koclanes et al. ............ 709/224 |
| 2004/0268069 A1 | 12/2004 | Satoyama et al. |
| 2005/0022201 A1 | 1/2005 | Kaneda et al. ............. 709/229 |
| 2005/0114532 A1 | 5/2005 | Chess et al. ................. 709/230 |

FIG.3

| VOLUME ALLOCATION REQUEST ||
|---|---|
| CAPACITY | |
| AccessBandwidthHint | |
| StorageCostHint | |
| DataAvailabilityHint | |

| Hint | Access Bandwidth | Storage Cost | Data Availability |
|---|---|---|---|
| 0 | Don't Care | Don't Care | Don't Care |
| 1 | 1Gbps | 1 ¢/MB | 99.9% |
| 2 | 1Gbps | 1 ¢/MB | 99.9% |
| 3 | 1Gbps | 1 ¢/MB | 99.9% |
| 4 | 1Gbps | 1 ¢/MB | 99.9% |
| 5 | 1Gbps | 1 ¢/MB | 99.9% |
| 6 | 2Gbps | 1 ¢/MB | 99.9% |
| 7 | 2Gbps | 1 ¢/MB | 99.9% |
| 8 | 2Gbps | 1 ¢/MB | 99.9% |
| 9 | 2Gbps | 1 ¢/MB | 99.9% |
| 10 | 2Gbps | 1 ¢/MB | 99.9% |

| Hint | Access Bandwidth | Storage Cost | Data Availability |
|---|---|---|---|
| 0 | Don't Care | Don't Care | Don't Care |
| 1 | 1Gbps | 2 ¢/MB | 99.999% |
| 2 | 1Gbps | 2 ¢/MB | 99.999% |
| 3 | 1Gbps | 2 ¢/MB | 99.999% |
| 4 | 1Gbps | 2 ¢/MB | 99.999% |
| 5 | 1Gbps | 2 ¢/MB | 99.999% |
| 6 | 2Gbps | 2 ¢/MB | 99.999% |
| 7 | 2Gbps | 2 ¢/MB | 99.999% |
| 8 | 2Gbps | 2 ¢/MB | 99.999% |
| 9 | 10Gbps | 2 ¢/MB | 99.999% |
| 10 | 10Gbps | 2 ¢/MB | 99.999% |

FIG.5A

ABH: AccessBandwidthHint
SCH: StorageCostHint
DAH: DataAvailabilityHint

| VOLUME NUMBER | FC I/F NUMBER | CAPACITY | BANDWIDTH | VOLUME HINT INFORMATION | | |
|---|---|---|---|---|---|---|
| | | | | ABH | SCH | DAH |
| 3412 | 3714 | 200GB | 2Gbps | 10 | 0 | 10 |
| | | | | | | |
| | | | | | | |

FIG.5B

| VOLUME NUMBER | FC I/F NUMBER | CAPACITY | BANDWIDTH | VOLUME HINT INFORMATION | | |
|---|---|---|---|---|---|---|
| | | | | ABH | SCH | DAH |
| 3412 | 3714 | 200GB | 2Gbps | 10 | 0 | 10 |
| 3411 | 3711 | 200GB | 1Gbps | 1 | 10 | 0 |
| | | | | | | |

FIG.5C

| VOLUME NUMBER | FC I/F NUMBER | CAPACITY | BANDWIDTH | VOLUME HINT INFORMATION | | |
|---|---|---|---|---|---|---|
| | | | | ABH | SCH | DAH |
| | | | | | | |
| 3411 | 3711 | 200GB | 1Gbps | 1 | 10 | 0 |
| | | | | | | |

FIG.6A

| DRIVE LETTER | FC INTERFACE NUMBER | VOLUME NUMBER | MIGRATION FLAG |
|---|---|---|---|
| C | 3714 | 3412 | 0 |
|  |  |  |  |
|  |  |  |  |

FIG.6B

| DRIVE LETTER | FC INTERFACE NUMBER | VOLUME NUMBER | MIGRATION FLAG |
|---|---|---|---|
| C | 3714 | 3412 | 0 |
| D | 3711 | 3411 | 0 |
|  |  |  |  |

FIG.6C

| DRIVE LETTER | FC INTERFACE NUMBER | VOLUME NUMBER | MIGRATION FLAG |
|---|---|---|---|
| C | 3714 | 3412 | 1 |
| D | 3711 | 3411 | 0 |
|  |  |  |  |

FIG.6D

| DRIVE LETTER | FC INTERFACE NUMBER | VOLUME NUMBER | MIGRATION FLAG |
|---|---|---|---|
| C | 3727 | 3429 | 0 |
| D | 3711 | 3411 | 0 |
|  |  |  |  |

FIG.7A

ABH: AccessBandwidthHint
SCH: StorageCostHint
DAH: DataAvailabilityHint

| VOLUME NUMBER | FC I/F NUMBER | CAPACITY | BANDWIDTH | VOLUME HINT INFORMATION | | |
|---|---|---|---|---|---|---|
| | | | | ABH | SCH | DAH |
| | | | | | | |
| | | | | | | |
| | | | | | | |

| VOLUME NUMBER | FC I/F NUMBER | CAPACITY | BANDWIDTH | VOLUME HINT INFORMATION | | |
|---|---|---|---|---|---|---|
| | | | | ABH | SCH | DAH |
| 3429 | 3727 | 200GB | 10Gbps | 10 | 0 | 10 |
| | | | | | | |
| | | | | | | |

384

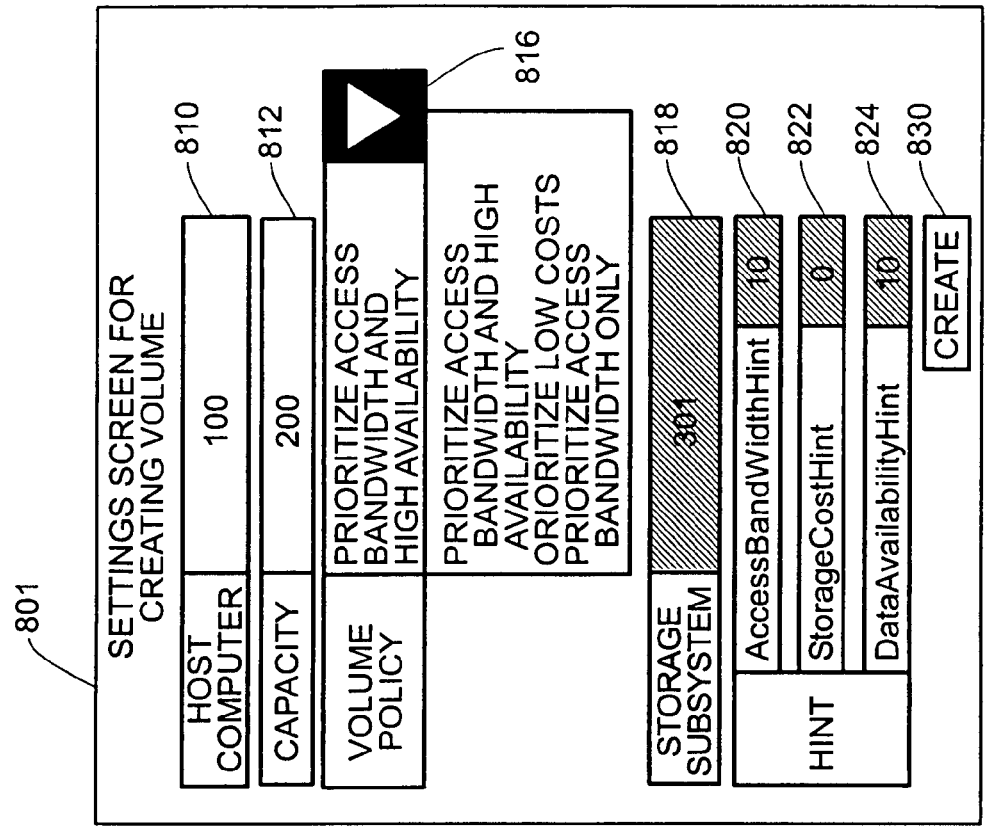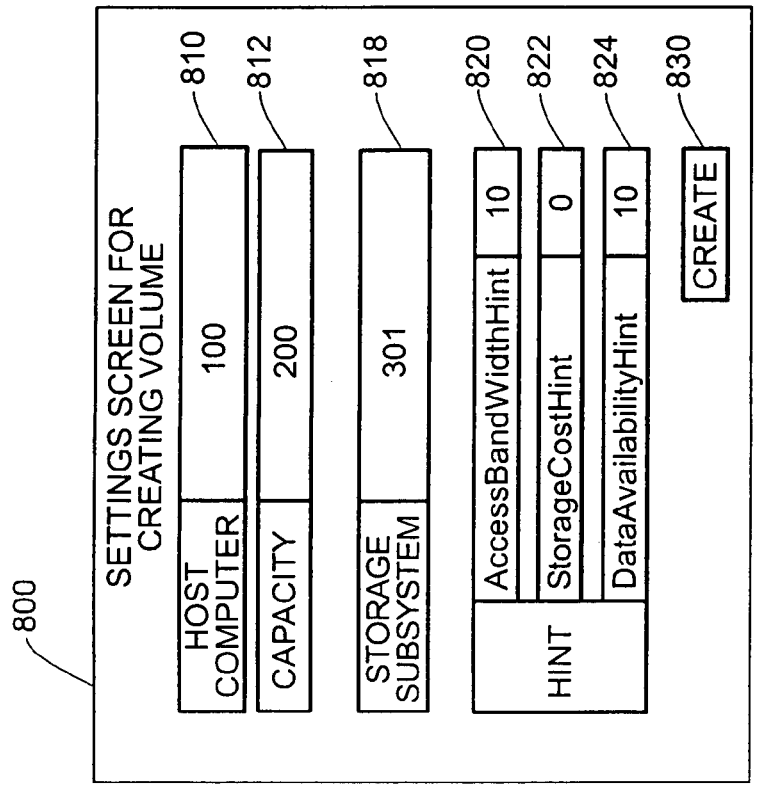
FIG.8A
FIG.8B

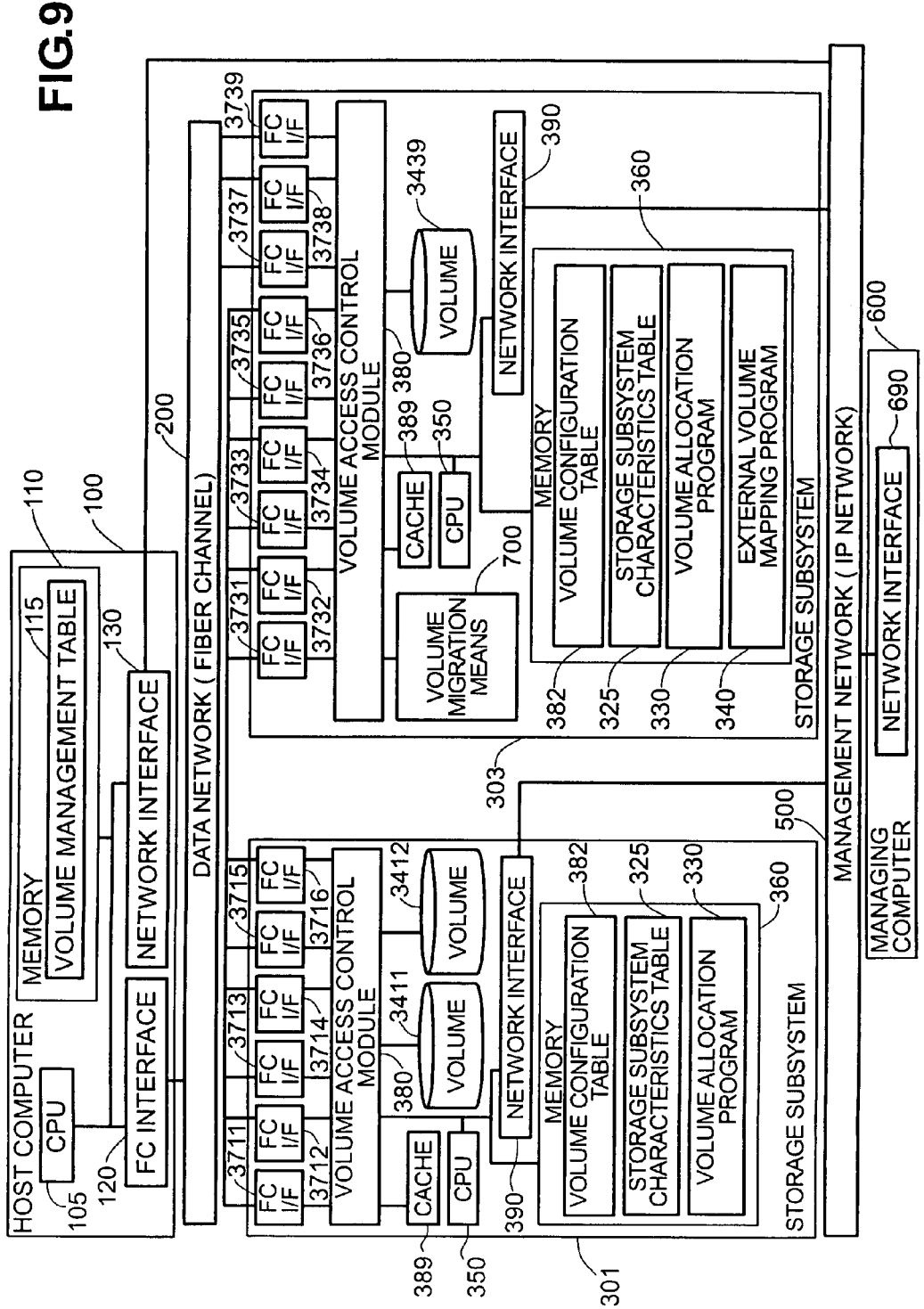

ABH: AccessBandwidthHint
SCH: StorageCostHint
DAH: DataAvailabilityHint

| VOLUME NUMBER | FC I/F NUMBER | CAPACITY | BANDWIDTH | VOLUME HINT INFORMATION | | | EXTERNAL STORAGE SUBSYSTEM | |
|---|---|---|---|---|---|---|---|---|
| | | | | ABH | SCH | DAH | FC I/F NUMBER | VOLUME NUMBER |
| 3432 | 3738 | 200GB | 2Gbps | 10 | 0 | 10 | 3714 | 3412 |
| 3431 | 3737 | 200GB | 1Gbps | 1 | 10 | 0 | 3711 | 3411 |

| VOLUME NUMBER | FC I/F NUMBER | CAPACITY | BANDWIDTH | VOLUME HINT INFORMATION | | | EXTERNAL STORAGE SUBSYSTEM | |
|---|---|---|---|---|---|---|---|---|
| | | | | ABH | SCH | DAH | FC I/F NUMBER | VOLUME NUMBER |
| 3432 | 3738 | 200GB | 2Gbps | 10 | 0 | 10 | 3714 | 3412 |
| 3431 | 3737 | 200GB | 1Gbps | 1 | 10 | 0 | 3711 | 3411 |
| 3439 | 0 | 200GB | 10Gbps | 10 | 0 | 10 | 0 | 0 |

| VOLUME NUMBER | FC I/F NUMBER | CAPACITY | BANDWIDTH | VOLUME HINT INFORMATION | | | EXTERNAL STORAGE SUBSYSTEM | |
|---|---|---|---|---|---|---|---|---|
| | | | | ABH | SCH | DAH | FC I/F NUMBER | VOLUME NUMBER |
| 3431 | 3737 | 200GB | 1Gbps | 1 | 10 | 0 | 3711 | 3411 |
| 3432 | 3738 | 200GB | 10Gbps | 10 | 0 | 10 | 0 | 0 |

FIG.11

| DRIVE LETTER | FC INTERFACE NUMBER | VOLUME NUMBER | MIGRATION FLAG |
|---|---|---|---|
| C | 3738 | 3432 | 0 |
| D | 3737 | 3431 | 0 |
|   |   |   |   |

115

METHOD, DEVICE AND PROGRAM FOR MANAGING VOLUME

CROSS-REFERENCES TO RELATED APPLICATIONS

The present application is a continuation of application Ser. No. 10/828,286, filed Apr. 21, 2004, now U.S. Pat. No. 7,260, 699; which claims priority from Japanese Patent Application No. 2004-006214, filed on Jan. 14, 2004, and No. 2004-066548, filed on Mar. 10, 2004, the entire disclosures of which are incorporated herein by reference.

BACKGROUND OF THE INVENTION

The present invention relates to a method of managing a volume in a computer system that includes multiple storage subsystems.

In recent years, storage network structures have been used in which multiple servers, multiple storage subsystems, backup devices and the like are connected by switches, hubs, etc. These are chiefly called SANs (Storage Area Networks). The advantages obtained by building a computer system with a storage network include excellent scalability, and reduced administrative costs are achieved by enabling integrated management of data that is dispersed across multiple storage subsystems.

Furthermore, when using large-scale storage subsystems—i.e., most notably for disk array subsystems—managing means are provided for creating volumes to store information (i.e., data and programs) to be used by host computers inside the storage system. However, the managing means for creating the volumes use different interfaces and different formats for making requests, depending on the vendor that created the storage subsystem. Therefore, when a storage subsystem made by a different vendor is introduced to the system, the administrator of the storage subsystems needs to be able to remember the interfaces and request the formats used by each vendor. In a large-scale scale computer system, this causes significant problems. In order to overcome these problems, the DMTF (Distributed Management Task Force) has created a CIM (Common Information Model) and WBEM (Web-Based Enterprise Management). These standards determine the interface and request formats to be used when creating a volume in a storage subsystem. For example, "Device27_StorageServices.mof v.2.7.1" in Device Storage Services 2.7 was released. By using the interface defined in the CIM, a volume can be created according to a uniform method even in storage subsystems made by different vendors. The CIM definitions stipulate that "hints" are to be used in the interface and request formats when creating volumes.

(extracted from Device27_StorageServices.mof)
```
//
=========================================================
============
// StorageSettingWithHints
//
=========================================================
============ [Experimental, Version("2.7.1"), Description (
    "This subclass of StorageSetting allows a client to specify "
    "'hint's for optimization of the volume performance. The effect "
    "of these hints is implementation dependent.") ]
class CIM_StorageSettingWithHints: CIM_StorageSetting {
    [MinValue (0), MaxValue (10), Description (
        "This hint is an indication from a client of the importance "
        "placed on data availability. Values are 0=Don't Care to "
        "10=Very Important.")
    ]
    uint16 DataAvailabilityHint;
    [MinValue (0), MaxValue (10), Description (
        "This hint is an indication from a client of the randomness "
        "of accesses. Values are 0=Entirely Sequential to "
        "10=Entirely Random.") ]
    uint16 AccessRandomnessHint;
    [MinValue (0), MaxValue (10), Description (
        "This hint is an indication from a client of the direction "
        "of accesses. Values are 0=Entirely Read to "
        "10=Entirely Write.") ]
    uint16 AccessDirectionHint;
    [Description (
        "This hint is an indication from a client of the optimal "
        "access sizes. Several sizes can be specified."),
        Units ("MegaBytes") ]
    uint16 AccessSizeHint[ ];
    [MinValue (0), MaxValue (10), Description (
        "This hint is an indication from a client how important "
        "access latency is. Values are 0=Don't Care to "
        "10=Very Important.") ]
    uint16 AccessLatencyHint;
    [MinValue (0), MaxValue (10), Description (
        "This hint is an indication from a client of bandwidth "
        "prioritization. Values are 0=Don't Care to "
        "10=Very Important.") ]
    uint16 AccessBandwidthWeight;
    [MinValue (0), MaxValue (10), Description (
        "This hint is an indication of the importance the client "
        "places on the cost of storage. Values are 0=Don't Care to "
        "10=Very Important. A StorageVolume provider might choose "
        "to place data on low cost or high cost drives based on "
        "this parameter.") ]
    uint16 StorageCostHint;
    [MinValue (0), MaxValue (10), Description (
        "This hint is an indication of the importance placed on "
        "storage efficiency by the client. Values are 0=Don't Care "
        "to 10=Very Important. A StorageVolume provider might choose "
        "different RAID levels based on this hint.") ]
    uint16 StorageEfficiencyHint;};
```

Using these "hints" enables the volume to be made with abstract designations. This allows the volumes to be created with a uniform request format even when the hardware structure of each vendor's storage subsystem is completely different.

Japanese Patent Application Laid-open No. 2003-140836 discloses a method which is used to enable the distribution of a volume among multiple storage subsystems in the SAN environment to be optimized easily by having the administrator redistribute the volume. This volume management method is summarized as follows:

Multiple storage subsystems that are connected to a SAN environment are classified into multiple groups (classes), or multiple disk devices that constitute the storage subsystems are classified into multiple groups (classes); and, for each of these classes, class attributes are configured (i.e., threshold values for usage of the storage subsystems). Either a SAN management server that is connected to the SAN, or a server utilizing the volumes in the storage subsystems, obtains from the multiple storage subsystems vendor information indicating the vendor of the storage subsystem (i.e., manufacturer information), usage status information, and class attributes. In order to redistribute the volume in a first class to an appropriate volume in a second class, the volume in the second class is selected based on the vendor information (manufacturer information), the usage status information, and the class attribute information. Then, data in the first volume is copied into the second volume, and the correspondence for keeping track of the volume is changed from the first volume to the second volume to achieve redistribution.

In accordance with the volume redistribution method disclosed in Japanese Patent Application Laid-open No. 2003-140836, the volume migrates across classes or within the same class based on the usage status information which is determined per class, the class attributes, and the storage subsystem's vendor information.

However, there is no disclosure of migrating a volume among the multiple storage subsystems that are connected to the network. Furthermore, even when each vendor's storage subsystems have different storage structures, the hints still enable the creation of volumes with uniform request formats; however, even if the same values are defined for the hints, there are many cases where the properties that are actually exhibited by the devices in correspondence to these values will be different in different storage subsystems produced by different vendors and the like. Therefore, when dealing with a volume that in multiple storage subsystems, it is difficult for the administrator to use the hints as a way to allocate the volumes to effectively utilize the resources.

SUMMARY OF THE INVENTION

The present invention has been made in light of the above-mentioned problems, and it is therefore an object of this invention to enable effective utilization of resources (volume) in multiple storage systems by using levels (hints), which indicate the specific performances of the volumes designated when the volumes are allocated.

In accordance with one embodiment for achieving the aforementioned object of the present invention, a management computer, that is connected via a network to storage systems having volumes connected via a network to a host computer to store data used by the host computer, maintains a correspondence between a level indicating a specific performance of a volume and storage system characteristics of the storage system, obtains from a first storage system a level indicating the performance of a volume which the first storage system allocated to the host computer, and references the first storage system characteristics corresponding to the obtained level indicating the performance of the volume and the storage system characteristics of another storage system, and compares the performances of the volumes of the respective storage systems.

Other characteristics of the present invention will become clear from the descriptions given in the present specification and from the attached drawings.

BRIEF DESCRIPTION OF THE DRAWINGS

FIG. 3 is a diagram showing the format of a volume creation request.

FIGS. 4A and 4B are tables showing examples of storage subsystem characteristics.

FIGS. 5A to 5C are diagrams showing examples of volume information pertaining to volumes in a first storage subsystem.

FIGS. 6A to 6D are diagrams showing volume management tables in a host computer.

FIGS. 7A and 7B are diagrams showing volume information pertaining to volumes in a second storage subsystem.

FIGS. 8A to 8B are diagrams showing setting screens for creating the volumes.

FIG. 9 is a block diagram showing a computer system in accordance with Embodiment 2.

FIGS. 10A to 10C are diagrams showing volume information pertaining to volumes in a third storage subsystem.

FIG. 11 is a diagram showing a volume management table in a host computer in accordance with Embodiment 2.

DETAILED DESCRIPTION OF THE PREFERRED EMBODIMENTS

Embodiments of the present invention will now be explained in detail with reference to the drawings.

Outline of Embodiments

Figure 1:
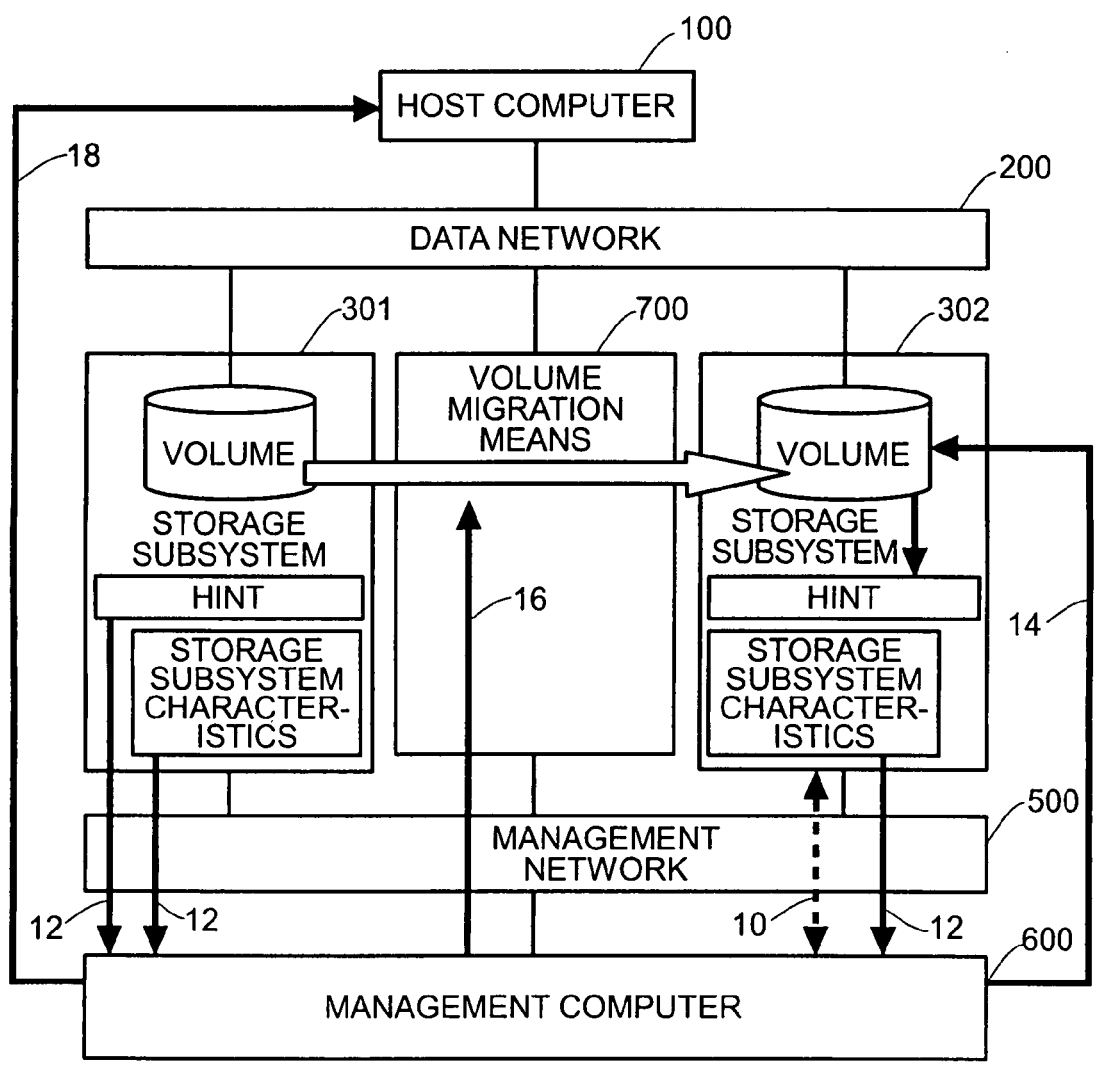
FIG. 1 is a block diagram showing an outline of an embodiment of the present invention.

FIG. 1 will be used to explain an outline of the embodiments for practicing the present invention. In the computer system shown in FIG. 1, a host computer 100, which uses storage space, is connected to a storage subsystem 301 and a storage subsystem 302 through a data network 200; and a management computer 600, which manages the storage subsystem 301 and the storage subsystem 302, is connected to the storage subsystems 301, 302 through a management network 500.

In the system configuration shown in FIG. 1, the computer system (which is constituted of the host computer 100, the storage subsystem 301 and the management computer 600) also has the additional storage subsystem 302 added thereto. (This is a variant configuration.) Furthermore, the data network 200 is provided with volume migration means 700 for transferring data between volumes. The volume migration means 700 is also connected to the management network 500 so that it can receive transfer requests from the management computer 600.

When the management computer 600 detects the addition of the storage subsystem 302 (10), the management computer 600 then obtains storage subsystem characteristics and a "hint" from the storage subsystem 301 and from the storage subsystem 302, respectively (12). The management computer 600 then reevaluates the storage subsystem characteristics and the hints. If creating the volume in the newly added storage subsystem 302 would enable a volume that is closer to the hint, then the "hint" that is associated with that volume is used to create a volume in the storage subsystem 302 (14), and then the data in the volume in the storage subsystem 301 is transferred to the newly created volume in the storage subsystem 302 using the volume migration means 700. Finally, the management computer 600 sends a notification to the host computer 100 to indicate that the volume has been migrated and the host computer 100 is configured so as to reference the volume in the storage subsystem 302 on subsequent occasions (18). This enables the host computer to use the volume that more closely matches the "hint".

Embodiment 1

(1) System Structure

Figure 2:
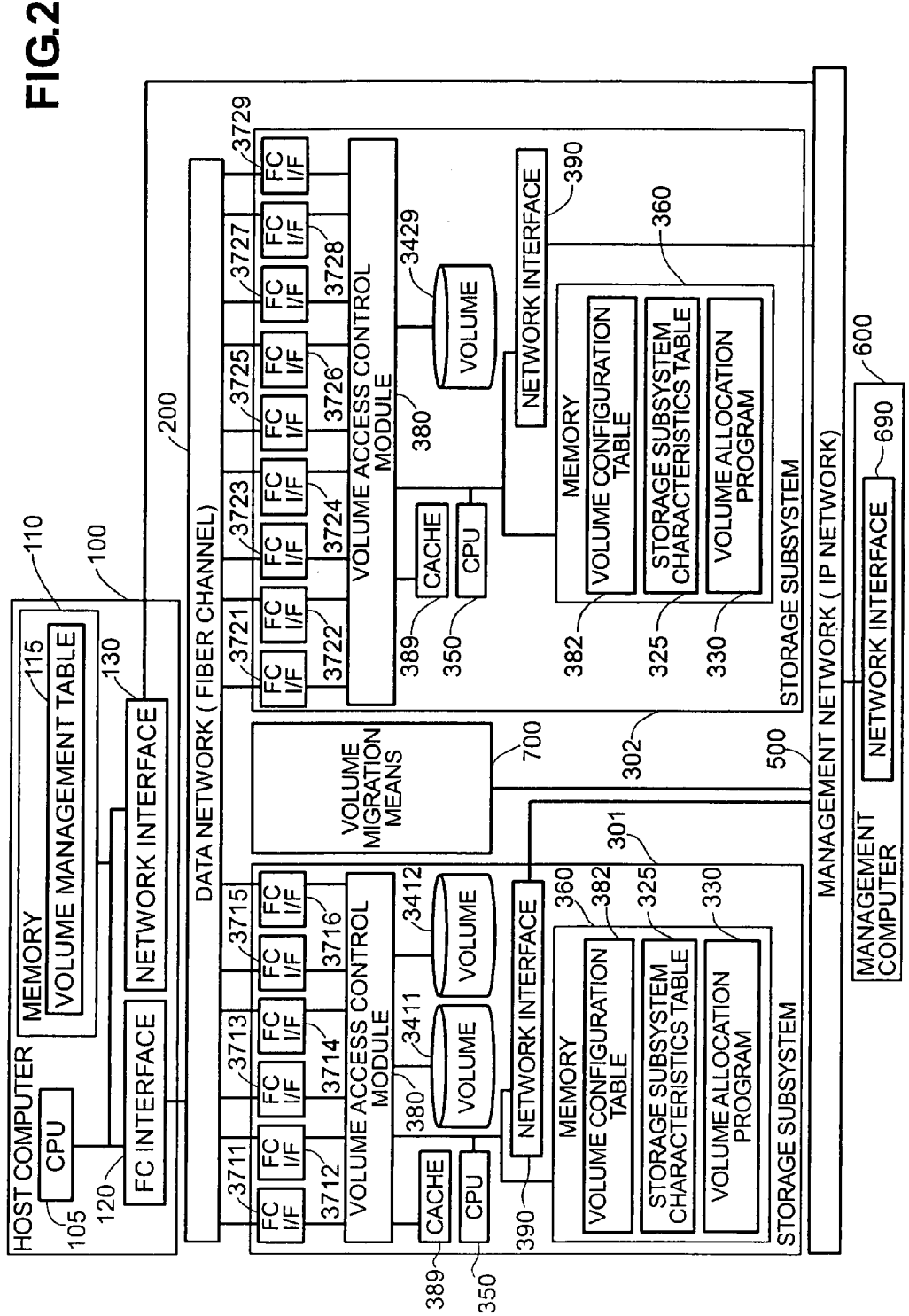
FIG. 2 is a block diagram showing a computer system in accordance with Embodiment 1.

FIG. 2 shows a system structure in accordance with Embodiment 1. In the computer system shown in FIG. 2, the host computer 100, which uses the volume, is connected to the storage subsystem 301 and the storage subsystem 302 through the data network 200; and the management computer 600, which manages the storage subsystem 301 and the storage subsystem 302, is connected to the storage subsystem 301 and the storage subsystem 302 through the management network 500. In the system shown in FIG. 2, the computer system (which is constituted of the host computer 100, the storage subsystem 301 and the management computer 600) has the storage subsystem 302 added to it. (This is a variant construction.) Furthermore, the data network 200 is provided with the volume migration means 700 for transferring data among the volumes. The volume migration means 700 is connected to the management network 500 so that it can receive data transfer requests from the management computer 600. In the present embodiment, the data network 200 is a fiber channel and the management network 500 is an IP (Internet Protocol) network. The data network and the management network are not restricted to the above descriptions. Furthermore, the data network and the management network can be a different network or the same network.

Host Computer

The host computer 100 is constituted of: a CPU 105 for governing execution of programs; a memory 110 for storing programs and data necessary for execution of programs; a fiber channel interface (below, abbreviated as "FC interface") 120 for connecting to the data network 200 and executing exchanges of data between the storage subsystem 301 and the storage subsystem 302; and a network interface 130 for connecting to the management network.

The host computer 100 is capable of storing data generated by execution of the programs into the volumes of storage subsystems connected to the data network 200 via the FC interface 120. Furthermore, the host computer 100 can obtain the programs themselves and the data necessary to execute the programs from the volumes in the storage subsystems via the FC interface 120.

A volume management table 115 (see FIG. 6) is provided inside the memory 110 of the host computer 100. The volume management table 115 manages which volume in which storage subsystem corresponds to the volume that is being used by the application on the host computer 100 via the file system. In accordance with the present embodiment, the volume management table 115 is identified by means of a drive letter allocated to the volume, an FC interface number and a volume number. A WWN (World Wide Name) is generally used as the FC interface number. Furthermore, a LUN (Logical Unit Number) determined by an SCSI (Small Computer System Interface) is generally used as the volume number. In the present embodiment, in order to simplify the correspondence to the drawings, explanations will be given using the numbers that are used in the diagrams themselves instead of the WWN and the LUN numbers. The host computer 100 reads out data from the volumes and writes data into the volumes in accordance with the volume management table 115. The present embodiment is constructed such that the volume management table 115 can be rewritten from the management computer 600 through the network interface 130.

Storage Subsystems

A structure for the storage subsystems will now be explained. The storage subsystems 301, 302 have: a CPU 350 for governing execution of programs; a memory 360 for storing programs and information necessary for executing programs; a network interface 390 for executing communications with the management computer 600; FC interfaces (3711-3716, 3721-3729) for executing exchanges of data with the host computer 100; a volume access control module 380 for processing data read/write requests from the host computer 100; a cache 389 for temporarily storing data received from the host computer 100 and data read from the volumes; and volumes 3411, 3412 for actually storing the data.

In the storage subsystem, the volumes which have already been allocated and the volumes which are not yet allocated are managed by means of the volume information on the volumes that are already allocated to the host computer, managed by the volume access control module 380. In accordance with the present embodiment, the storage subsystem 301 stores volume information 383, and the storage subsystem 302 stores volume information 384.

The memory 360 holds the storage subsystem characteristics 325 and the volume information 382, and it has a volume allocation program 330 for allocating the volumes in accordance with a volume creation request from the management computer 600. This program is stored on a ROM, a magnetic disk, or other nonvolatile storage medium inside the storage subsystem, and, when the storage subsystem is booted, the program is loaded into the memory 360 and is executed. Alternatively, the processes performed with the program can also be achieved by means of hardware constructions inside the storage subsystem.

A difference between the storage subsystems 301 and 302 is the bandwidth and quantity of the FC interfaces. The storage subsystem 301 has six FC interfaces: FC interfaces 3711-3713 with bandwidths of 1 Gbps, and FC interfaces 3714-3716 with bandwidths of 2 Gbps. The storage subsystem 302 has nine FC interfaces: FC interface 3721-3723 with bandwidths of 1 Gbps, FC interfaces 3724-3726 with bandwidths of 2 Gbps, and FC interfaces 3727-3729 with bandwidths of 10 Gbps.

FIG. 3 shows an example of the parameters which are contained in the volume creation request which the management computer 600 issues to the storage subsystem. In accordance with the present embodiment, the parameters include four hints: how much capacity the volume that will be created should have; an AccessBandwidthHint (ABH) indicating how strongly a broad bandwidth is desired for the bandwidth for accessing from a host; a StorageCostHint (SCH) indicating how strongly an inexpensive bit unit price is desired for the bits constituting the volume in the storage subsystem; and a DataAvailabilityHint (DAH) indicating how strongly a highly available volume is desired for the volume.

Of these four hints, three will be used to explain the present embodiment: ABH, SCH and DAH. A value between 1 and 10 is allocated to each of these hints to allocate a level within a ten-level range. This level indicates how important it is that the volume has the performance indicated by each hint. For example, level "0" can mean "Don't care", meaning that the hint in question is not considered important. In this case, the volume performance indicated by the given hint will be set to a low level in the respective storage subsystem. The given hint is considered to be more important as the number indicating the level increases. Level "10" indicates that the given hint is considered most important, and the volume performance corresponding to that hint will be the best that the storage subsystem can provide. In the present embodiment, examples of the types of hints defined by the DMTF (Distributed Management Task Force) for the CIM (Common Information Model) are used. However, other hints defined by the CIM and hints not defined by the CIM can also be used to achieve the present embodiment.

FIGS. 4A and 4B illustrate tables which show correspondences between the hints and each type of storage subsystem characteristics in accordance with the present invention. In a storage subsystem characteristics table 325, the storage subsystem 301 holds the storage subsystem characteristics 326 shown in FIG. 4A, and the storage subsystem 302 holds the storage subsystem characteristics 327 shown in FIG. 4B. The storage subsystem characteristics 326 indicate that the storage subsystem 301 can provide a volume at a bandwidth of 1 Gbps or 2 Gbps, with a bit unit price of 1¢/MB, with 99.9% availability. The storage subsystem characteristics 327 indicate that the storage subsystem 302 can provide a volume at a bandwidth of 1 Gbps or 2 Gbps or 10 Gps, with a bit unit price of 2¢/MB, with 99.999% availability.

The bit unit price is determined based on the storage subsystem's purchase price and purchasable amount. Therefore, in the present embodiment, a different value is allocated to each storage subsystem. Furthermore, the availability also is determined by the structure of the device's hardware (i.e., whether or not the storage subsystem has a redundant and/or hot-swappable power source and controller). Therefore, in the present embodiment, a different value is allocated to each storage subsystem. The storage subsystem characteristics 326, 327 also indicate that the hint levels can be changed without changing the volume that has been allocated. Since the bandwidth can be changed by changing the FC interface settings and the settings of a bandwidth controller, it is also possible to create volumes having different settings within the storage subsystem. In the storage subsystem 301, the AccessBandwidthHint can be set to 1-5 to create a volume with a bandwidth of 1 Gbps, and the AccessBandwidthHint can be set to 6-10 to create a volume with a bandwidth of 2 Gbps. If the hint level is 1, for example, then a greater value of 6 can indicate that the bandwidth for accessing the volume is greater, meaning that a volume with a better access bandwidth performance can be provided for the host computer. In the storage subsystem 302, the AccessBandwidthHint can be set to 1-5 to create a volume with a bandwidth of 1 Gbps, the AccessBandwidthHint can be set to 6-8 to create a volume with a bandwidth of 2 Gbps, and the AccessBandwidthHint can be set to 9-10 to create a volume with a bandwidth of 10 Gbps. In the storage subsystems, volumes having different bandwidths can be provided to the host computer by changing the FC interface for the newly created volume.

The present embodiment includes an example in which the hint level values are different, but the storage subsystem characteristics indicate the same performance values and performances. However, the storage subsystem characteristics can also be set to different values for each hint level.

Management Computer

Figure 12:
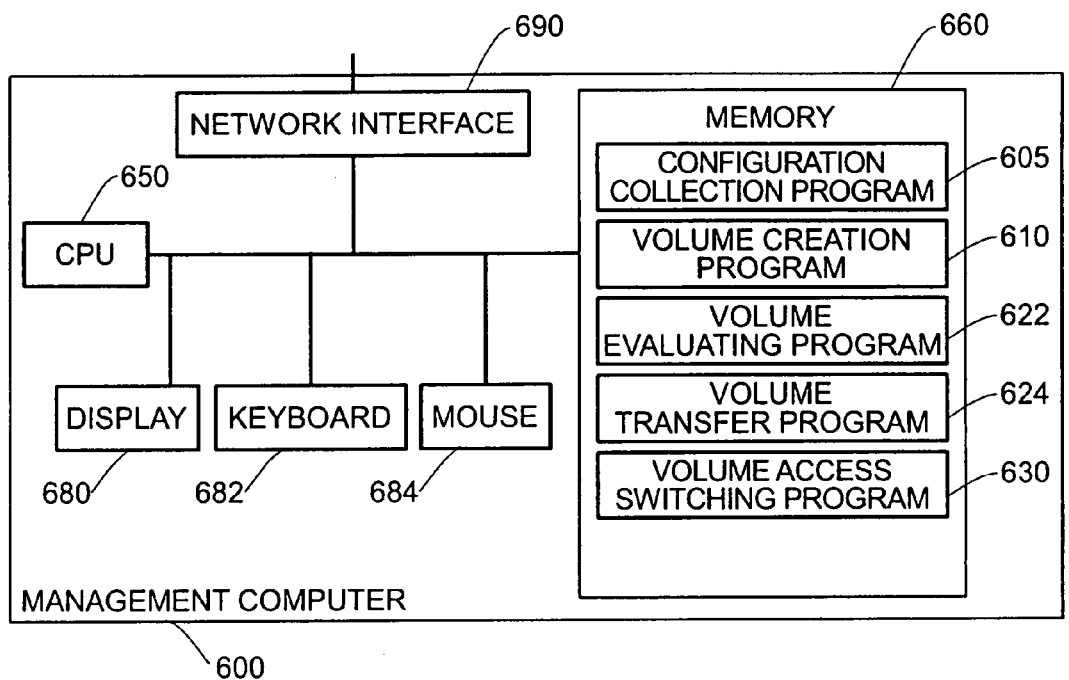
FIG. 12 is a block diagram showing the structure of a management computer in accordance with an embodiment.

FIG. 12 is a diagram showing the construction of the management computer in accordance with Embodiment 1. The management computer 600 is provided with: a CPU 650 for governing execution of programs; a memory 660 for storing programs and data necessary for executing programs; a display 680 for displaying program execution status; a keyboard 682 and a mouse 684 for inputting instructions from an administrator; and a network interface 690 for connecting to the management network.

The memory 660 in the management computer 600 has: a configuration collection program 605 for obtaining storage subsystem characteristics and volume information from the storage subsystem; a volume creation program 610 for creating the volume in the storage subsystem; a volume evaluating the program 622 for evaluating volume in a case where a new storage subsystem has been added; and a volume migration program 624 for migrating a volume from one storage subsystem to another storage subsystem based on evaluation results produced by the volume evaluating program 622. Although it is not shown in the diagrams, the memory 660 holds the storage subsystem characteristics and the volume information obtained from the storage subsystems and the volume management table obtained from the host computer. A volume migration program 630 will be explained in connection with Embodiment 2.

The programs are stored on a ROM, a magnetic disk or other nonvolatile storage medium inside the management computer 600, and, when the management computer is booted, the programs are loaded into the memory 360 and are executed. The processes achieved by the program can also be achieved by means of hardware constructions inside the management computer.

(2) Details of Volume Allocation Processing Performed by Storage Subsystem

Figure 13:
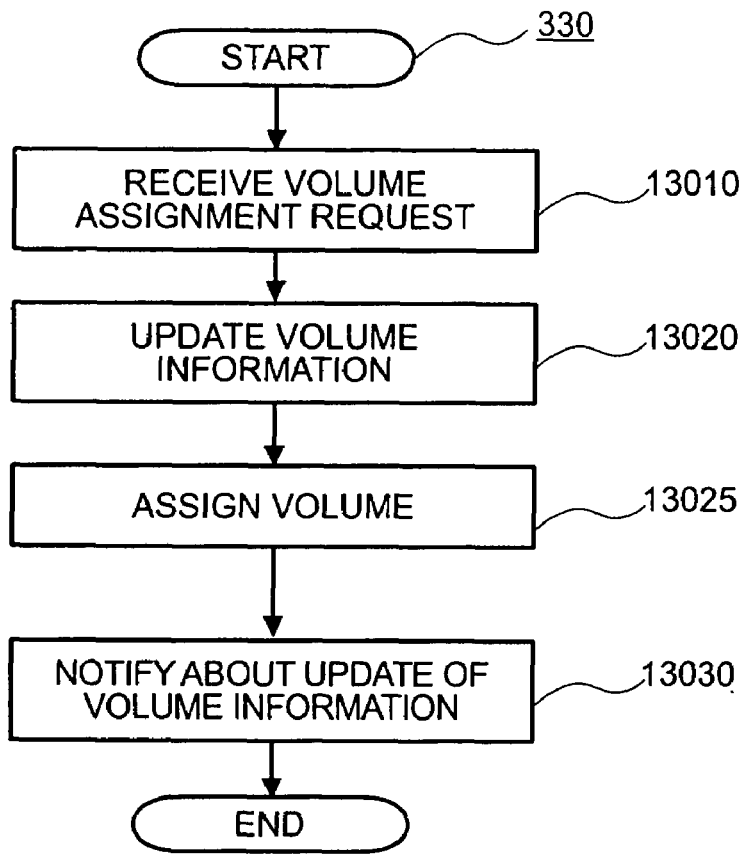
FIG. 13 is a flowchart representing a volume allocation program executed by the storage subsystem in accordance with an embodiment.

Next, an explanation will be given regarding the processing performed by the storage subsystem using the volume allocation program 330. FIG. 13 shows a flowchart of the volume allocation program 330. When the volume allocation program 330 receives a volume creation request from the management computer 600 (step 13010), the volume information being held in the volume configuration table 382 gets updated (step 13020). More specifically, the requested capacity is sectioned off from the unallocated volume and is allocated to the host computer (step 13025). Also, an unused FC interface having the value indicated in the AccessBandwidthHint is retrieved from among the unused FC interfaces, and the number of this FC interface is registered into the volume information. Then, the value of the hint that was received is registered into the volume information. After performing step 13025, a notification is then sent out to indicate that the volume information being held in the volume configuration table 382 has been updated (step 13030). This notification is sent out to the volume access control module 380 and to the management computer 600. This notification causes the volume access control module 380 to reference the volume information and connect to the FC interface to which the newly created volume was allocated. Furthermore, this notification also lets the management computer 600 know that the volume allocation is complete.

FIGS. 5A to 5C show examples of the volume information. FIG. 5A indicates that a volume 3412 is already allocated to the FC interface 3714, and that it has a capacity of 200 GB and a bandwidth of 2 Gbps. It also indicates that the hints received when the volume was allocated indicated "10" for the AccessBandwidthHint, "0" for the StorageCostHint, and "10" for the DataAvailabiltyHint.

(3) Outline of Processing Performed by Management Computer 600

An explanation will now be given regarding an outline of the processing performed by the management computer 600 in accordance with the present embodiment. In the present embodiment, the management computer 600 performs processing according to the following sequence.

First, the management computer 600 performs processing to obtain the system information from the storage subsystem 301, and it performs processing to give instructions to create the volume in the storage subsystem 301. Then, it performs processing to detect the storage subsystem 302 that has been newly added. Finally, it performs processing to give instructions to reevaluate and transfer the volume.

The above-mentioned processing is achieved by the following three programs. Namely, it involves the configuration collection program 605 for detecting the storage subsystem and obtaining the information; the volume creation program 610 for giving instructions to create the volume in the storage subsystem, and the volume evaluating program 622 which is used to perform the processing to reevaluate the volume that was created in the storage subsystem. An explanation will now be given regarding the flow of these programs.

(3-1) Processing to Obtain Configuration Information

Figure 14:
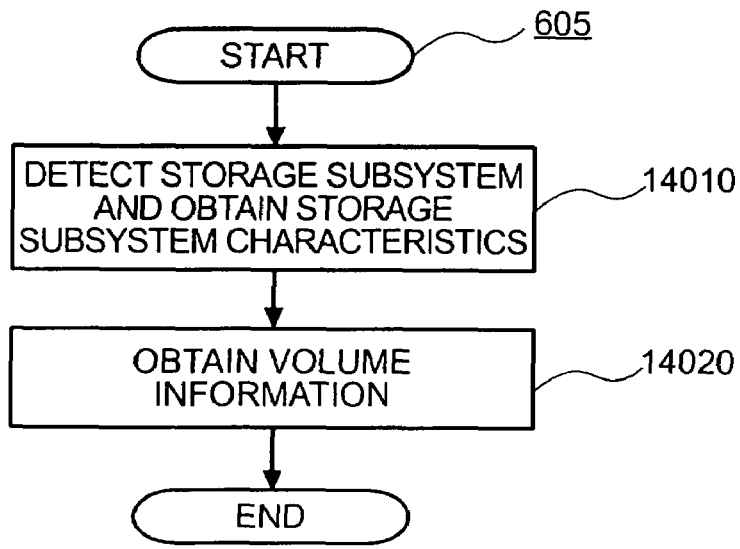
FIG. 14 is a flowchart representing a configuration collection program executed by the management computer in accordance with an embodiment.

FIG. 14 shows a flowchart representing the configuration collection program 605 that is executed by the management computer 600. First, the management computer 600 detects the storage subsystem that is connected to the management network 500, and it obtains the storage subsystem characteristics (step 14010). More specifically, it sends out a storage subsystem characteristics request over the management network 500 at given chronological intervals. The storage subsystem(s) send back the storage subsystem characteristics in response to the storage subsystem characteristics request. When this occurs, the management computer 600 has detected the storage subsystem. The storage subsystem characteristics that were sent back are held in the memory 660 so that, when volumes are created on future occasions, the information can be used to judge which storage subsystem the volume should be created in. After performing step 14010, the management computer 600 obtains the volume information (step 14020). More specifically, it emits the volume information request to the detected storage subsystem at given chronological intervals, and then holds the volume information that is returned in the memory 660.

The present embodiment will first be explained with respect to the case where only the storage subsystem 301 is connected. When the management computer 600 executes the configuration collection program 605, the storage subsystem characteristics 326 are received from the storage subsystem 301.

(3-2) Processing to Create the Volume

Volume Creation Program 610, and Concrete Example 1 Employing Volume Creation Program 610

Figure 15:
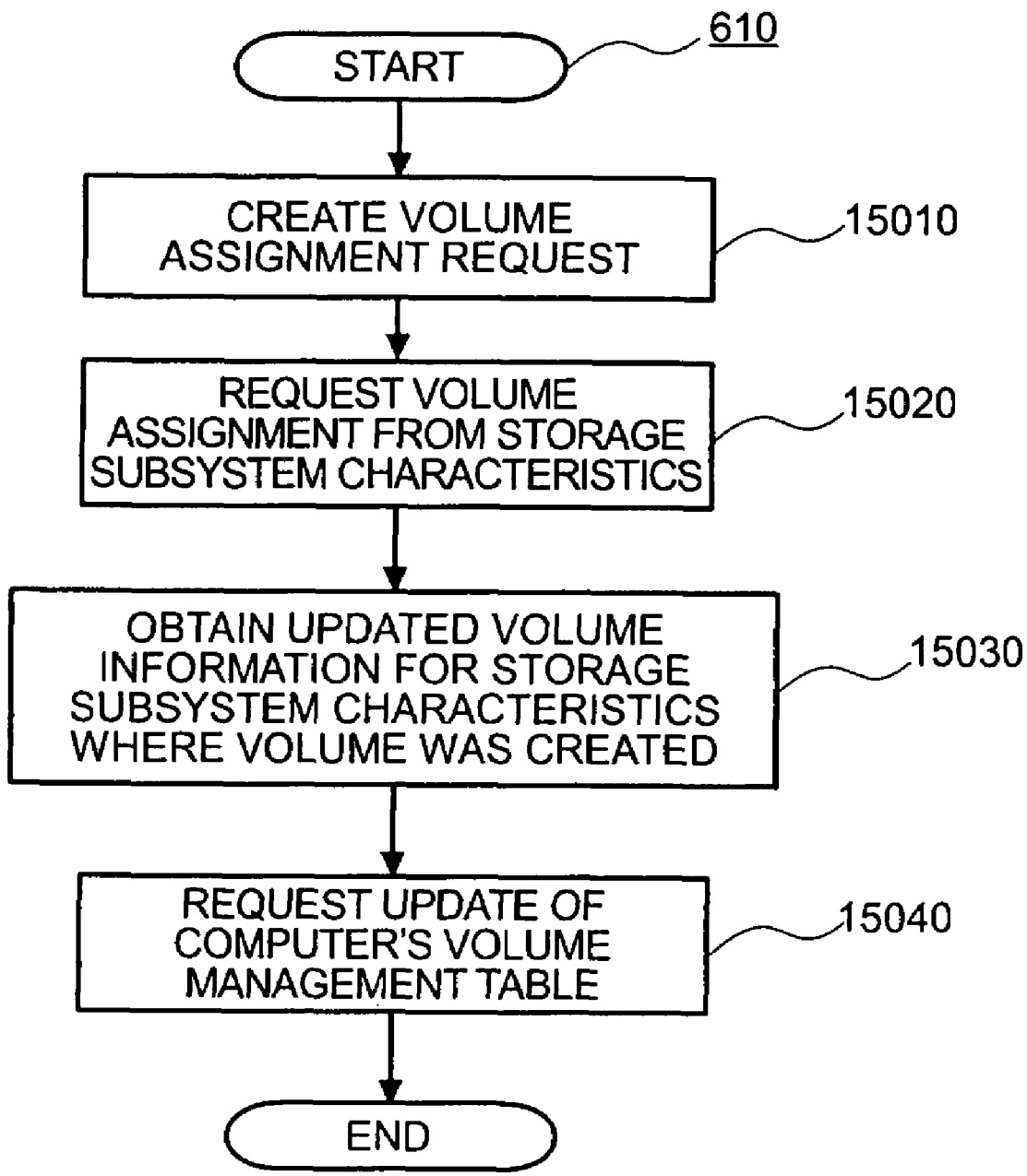
FIG. 15 is a flowchart representing a volume creation program executed by a user in accordance with an embodiment.

FIG. 15 shows a flowchart of the volume creation program 610 that is executed by the management computer 600. A concrete example of the processing in FIG. 15 will be explained with reference to FIG. 5, FIG. 6 and FIG. 8. The CPU of the management computer 600 executes the volume creation program 610, which is stored in the memory 660.

First, the management computer 600 creates the volume creation request (step 15010). More specifically, the administrator uses the display and the keyboard to input the target storage subsystem where the volume is to be created, the host computer which will use the volume, and the parameters of the volume creation request.

Examples of the input screens are shown in FIGS. 8A and 8B. A settings screen 800, such as shown in FIG. 8A, for creating the volume is displayed on the display 680 of the management computer 600. The settings screen 800 has six fields (810, 812, 818, 820, 822, 824). The administrator makes the following inputs as parameters in the volume creation request: a host computer that can read and write data to and from the volume is inputted into a host computer input field 810; the desired volume capacity is inputted into a capacity input field 812; the desired storage subsystem number is inputted into a storage subsystem input 818; and desired hints are inputted into the hints 820, 822, 824. Then the administrator presses a create button 830. By performing these operations, the volume creation request can be created in accordance with the volume creation request parameters that were inputted.

For example, in order to create a volume characterized by high speed and high availability, where cost is not an issue, the administrator would input "100" into the host computer input field 810, "200 (GB)" into the capacity input field 812, "301" into the storage subsystem input field 818, "10" into the AccessBandwidthHint input field 820, "0" into the StorageCostHint input field 822, and "10" into the DataAvailabiltyHint input field 824, and then the administrator presses the create button 830. By performing this operation, the volume creation request is created in accordance with the inputted volume creation request parameters. Returning to FIG. 15, an explanation will now be given regarding the volume creation program 610.

Next, the management computer 600 sends the volume creation request that was created at step 15010 to the storage subsystem designated by the volume creation request that was created at step 15010 as described above (step 15020).

After performing step 15020, the storage subsystem 301 receives the volume creation request from the management computer 600 and executes the volume allocation program 330 described above. More specifically, a 200 GB volume 3412 is sectioned off according to the creation request; and, since the AccessBandwidthHint is "10", the storage subsystem characteristics 326 are referenced and the volume 3412 is allocated to the unused 2 Gbps FC interface 3714, and then the volume information 383 is updated, as shown in FIG. 5A. The volume that is created here has a bandwidth of 2 Gbps and a bit unit price of 1¢/MB, with 99.9% availability. Furthermore, the fact that the hint level for the StorageCostHint is "0" and the AccessBandwidthHint and the DataAvailabilityHint are "10" means that the cost is not an issue (cost is not considered important) in the volume, but the volume has good bandwidth and availability (bandwidth and availability are considered important).

When the management computer 600 receives the notification from the storage subsystem indicating that the allocation of the volume is complete, the management computer 600 then obtains the volume information 383 that was updated with respect to the storage subsystem where the volume was created (step 15030).

Finally, the management computer 600 sends out a request to the host computer designated step 15010 described above, to request an update of the volume management table, because the creation of the volume is now complete (step 15040). For example, the management computer 600 may instruct the host computer 100 to update the volume management table 115 so that it looks like FIG. 6A. When the host computer 100 receives these instructions, it updates the volume management table 115, and this enables the host computer 100 to use the volume 3412 inside the storage subsystem 301 as its "C" drive via the FC interface 3714. The foregoing explanations describe the volume creation program 610.

The settings screen 800 shown in FIG. 8A for creating the volume may also be configured as a settings screen 801, which is shown in FIG. 8B. A difference between the settings screens 800 and 801 will be explained next. In the settings screen 800, in order to allocate a volume to a given host computer, individual administrators have to define all six input fields, including the storage subsystem and the three hints. But this requires the administrators to have sophisticated and extensive knowledge regarding the storage subsystem where the volume is to be created, and regarding the hints. Furthermore, in a case where multiple administrators divide the work of managing multiple storage subsystems and multiple host computers, there is a chance that each of the administrators will designate the storage subsystems and the hints according to his or her own standard, and that there will thus be no uniform standard for creating volumes across the system as a whole. When the settings screen 801 is used, the administrator who is thoroughly familiar with the system structure defines a "volume policy" in advance, which is a combination of a storage subsystem where volumes are frequently created and the hint values. This volume policy is then stored into the management computer 600. The individual administrators designate three input fields: the host computer input field 810, the capacity input field 812, and a volume policy selection field 816. When the administrators designate these three input fields, they can reference the "volume policy" pre-stored in the management computer 600 to obtain six inputs equivalent to the settings screen 800 described above. The settings screen 801 enables the administrators to reduce the burden of making inputs to create the volume.

By way of example, the volume policy could be one that places importance on achieving low costs, or places importance only on the access bandwidth. A volume policy that places importance on achieving low costs could define the StorageCostHint as "10", and the other hints could be defined as "0", and this could be stored in the memory of the management computer 600 as the volume policy defined for a specific storage. A volume policy that places importance only on the access bandwidth could define the AccessBandwidthHint as "10", and the other hints could be defined as "0", and this could be stored similarly in the memory 660 as the volume policy defined for a specific storage subsystem.

Concrete Example 2 Employing Volume Creation Program 610

As another specific example of how to apply the volume creation program 610, explanations will now be given regarding the processing for creating another volume in the storage subsystem 301.

This example similarly uses the settings screen 800 shown in FIG. 8A, which is used for creating the volume. The value "100" is inputted into the host computer input field 810. The description "200 (GB)" is inputted into the storage subsystem capacity input field 812. The value "1" is inputted into the AccessBandwidthHint input field 820, the value "10" is inputted into the StorageCostHint input field 822, the value "0" is inputted into the DataAvailabilityHint input field 824, and then the administrator presses the create button 830. This causes the management computer to create the volume creation request in accordance with the inputted parameters and to send the volume creation request to the storage subsystem 301.

When the storage subsystem 301 receives the volume creation request, it sections off the requested 200 GB volume. Since the AccessBandwidthHint is defined as "1", the volume information 383 is updated, as shown in FIG. 5B, so that the unused FC interface 3711 with 1-Gbps bandwidth gets allocated. The volume thus created will have a bandwidth of 1 Gbps and a bit unit price of 1¢/MB, with 99.9% availability. Furthermore, since the StorageCostHint is "10" and the AccessBandwidthHint is "1", it is clear that the cost is given a higher priority than the bandwidth. Since the DataAvailabilityHint is "0", it is also clear that little importance is allocated to the availability.

When the allocation of the volume is complete, the management computer 600 sends out instructions to the host computer 100 to update the volume management table 115 as shown in FIG. 6B. By updating the volume management table 115, the host computer 100 becomes able to use the volume 3411 in the storage subsystem 301 as its "D" drive via the FC interface 3711.

(3-3) Processing to Detect New Storage Subsystem

Next, an explanation will be given regarding the processing performed by the management computer 600, which is undertaken in the case where the storage subsystem 302 is added to the computer system after two volumes have already been created in the storage subsystem 301. In the present embodiment, when the storage subsystem 302 is added to the computer system, the FC interfaces 3721-3729 are connected to the data network and the network interface 390 is connected to the management network.

At given chronological intervals, the management computer 600 executes step 14010 of the configuration collection program 605, which has been described above. Then, when the storage subsystem 302 has been added to the computer system, the processing is performed to detect the storage subsystem 302, which is connected to the network interface 690 of the management computer 600 via the management network 500. This enables the storage subsystem characteristics of the storage subsystem 302 and the volume information to be obtained. The management computer 600 holds the obtained storage subsystem characteristics in the memory 660 so that on subsequent occasions it can be used to judge which storage subsystem to create the volume in when performing the processing to create the volume.

(3-4) Processing to Reevaluate and Transfer the Volume

After detecting the new storage subsystem, the management computer 600 begins the volume evaluating program 622 to evaluate the volumes that have already been allocated. Reevaluation refers to referencing the storage subsystem characteristics of the newly added storage subsystem and the volume information of the other storage subsystem(s), and to judging which storage subsystem can provide the volume that best matches the hints. If one can be provided, then the hint information is used to actually create the volume in the newly added storage subsystem, and to transfer the data that is being held in the volume. This enables the volume that matches the hint better to be provided to the host computer. Below, an explanation will be given regarding the volume evaluating program 622, which is executed by the management computer 600 in the beginning, and then a detailed explanation will be given regarding a concrete example of how to apply the volume evaluating program 622 in accordance with the present embodiment.

Explanation of Flow of Volume Evaluating Program 622

Figure 16:
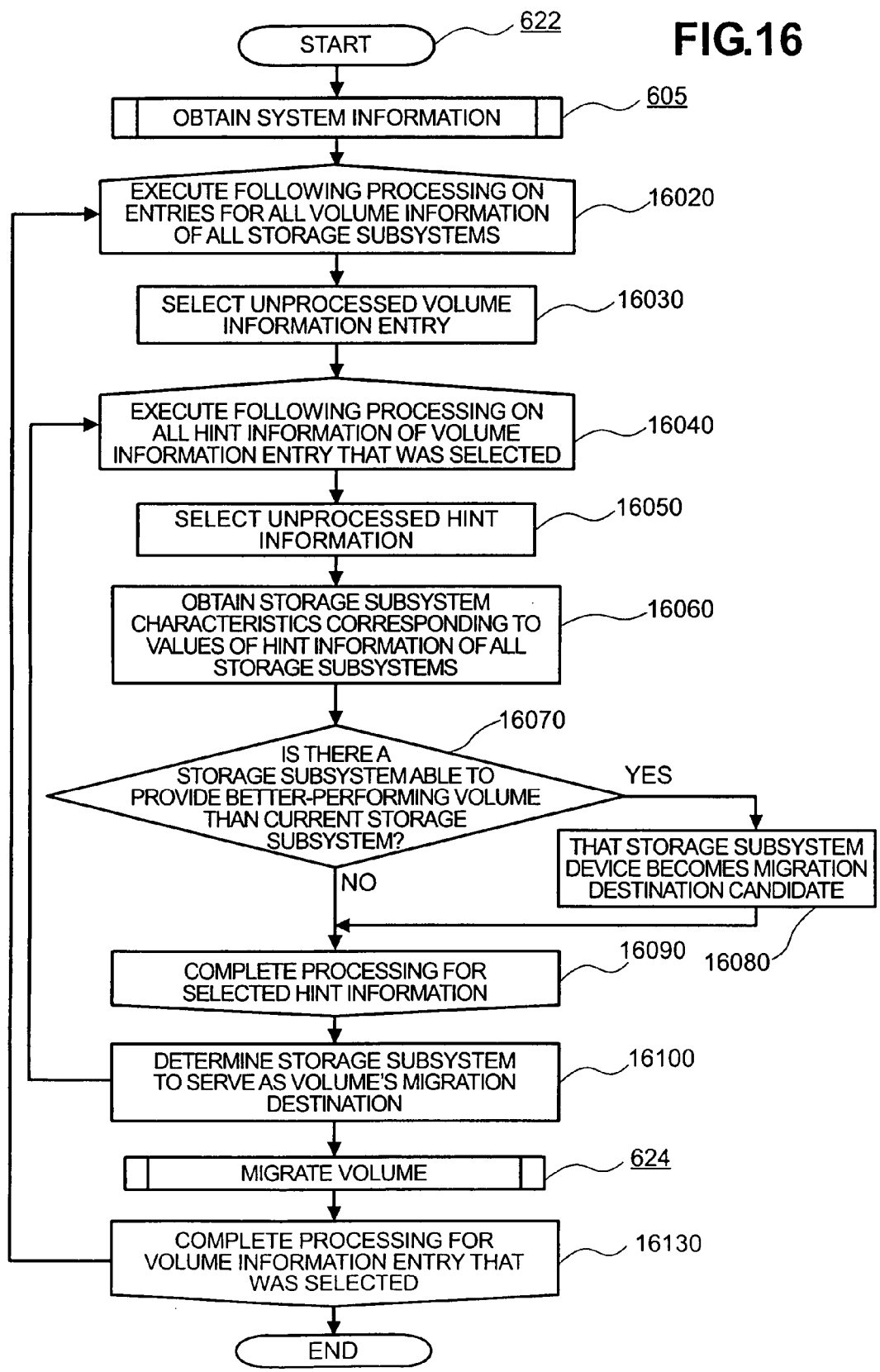
FIG. 16 is a flowchart representing a volume evaluating program executed by the management computer in accordance with an embodiment.

FIG. 16 shows a flowchart representing the volume evaluating program 622 that is executed by the management computer 600.

The management computer 600 uses the above-mentioned configuration collection program 605 to obtain the latest system information.

The processing from step 16030 to step 16130 is executed on all the volume information entries obtained from all the storage subsystems (step 16020).

First, a volume information entry which has not yet been processed is selected (step 16030).

Then, the processing of step 16050 to step 16090 is executed on all of the hint information defined in the volume information entry that has been selected (step 16040).

First, hint information which has not yet been processed is selected (step 16050).

For the selected hint information, the value for the hint information of the currently selected volume information entry is used to obtain the storage subsystem characteristics corresponding to the values for the hint information of all of the storage subsystems (step 16060). More specifically, by using, as a key, the combination of the hint information of the currently selected volume information entry and the value for the hint information, the storage subsystem characteristics of all the storage subsystems can be retrieved, and the storage subsystem characteristics that are provided with this hint value can be obtained.

After that, the storage subsystem characteristics received at step 16060 are compared to determine whether there is a storage subsystem which can provide a volume with a better performance than the storage subsystem which the storage subsystem characteristics entry that is currently selected belongs to (step 16070).

At step 16070, if there is a storage subsystem providing a volume with a better performance, then one can expect that the volume performance would be improved by migrating the volume from the storage subsystem where the volume currently is located, to the storage subsystem providing the volume with the better performance. Therefore, the storage subsystem providing the volume with the better performance becomes a transfer destination candidate (step 16080). Here, if multiple storage subsystems can provide volumes with a better performance, the transfer destination candidate can be only the storage subsystem providing the volume with the best performance, or, alternatively, all of the storage subsystems can become transfer destination candidates. Furthermore, even when multiple storage subsystems can provide superlative performance, the management computer 600 can freely select one subsystem of the storage subsystems as the transfer destination candidate, or, alternatively, all of the storage subsystems can become transfer destination candidates.

At step 16070, if there is no storage subsystem providing a volume offering a better performance, then there is no transfer destination candidate for the currently selected hint information. Finally, processing on the selected hint is considered complete (step 16090) and then the procedure returns to step 16040.

After step 16040 is repeated to perform the processing on all of the hint information, the management computer 600 determines which storage subsystem will serve as the volume transfer destination (step 16100). Here, the following methods can be used to determine the storage subsystem which is to be used to serve as the volume transfer destination. The management computer 600 can freely select a storage subsystem from among all of the storage subsystems that became transfer destination candidates through the repeated execution of step 16040. Or, information pertaining to all of the transfer destination candidate storage subsystems can be outputted on the display 680, and the administrator can make a selection. Or, the administrator can assign definitions in advance to assign weights to the hint information, and a storage subsystem which is a transfer destination candidate can be selected with priority over the others because of one of the hints. On the other hand, there are also cases where the storage subsystem(s) selected as the transfer destination(s) would offer an improvement in performance with respect to a certain hint, but would not offer an improvement with respect to another hint. For example, the access bandwidth may be improved, but availability may suffer. In this type of case, a dialogue box can be displayed to the administrator to confirm whether the volume may be migrated, or, alternatively, the following steps can be performed without asking the administrator to provide confirmation.

After determining which storage subsystem at step 16100 is to serve as the volume transfer destination, the management computer 600 transfers the volume (step 624).

After performing step 624, the processing on the selected volume information is considered complete (step 16130), and then the procedure returns to step 16020.

The foregoing explanations have described the volume evaluating program 622.

Explanation of Flow of Volume Migration Program 624

Figure 17:
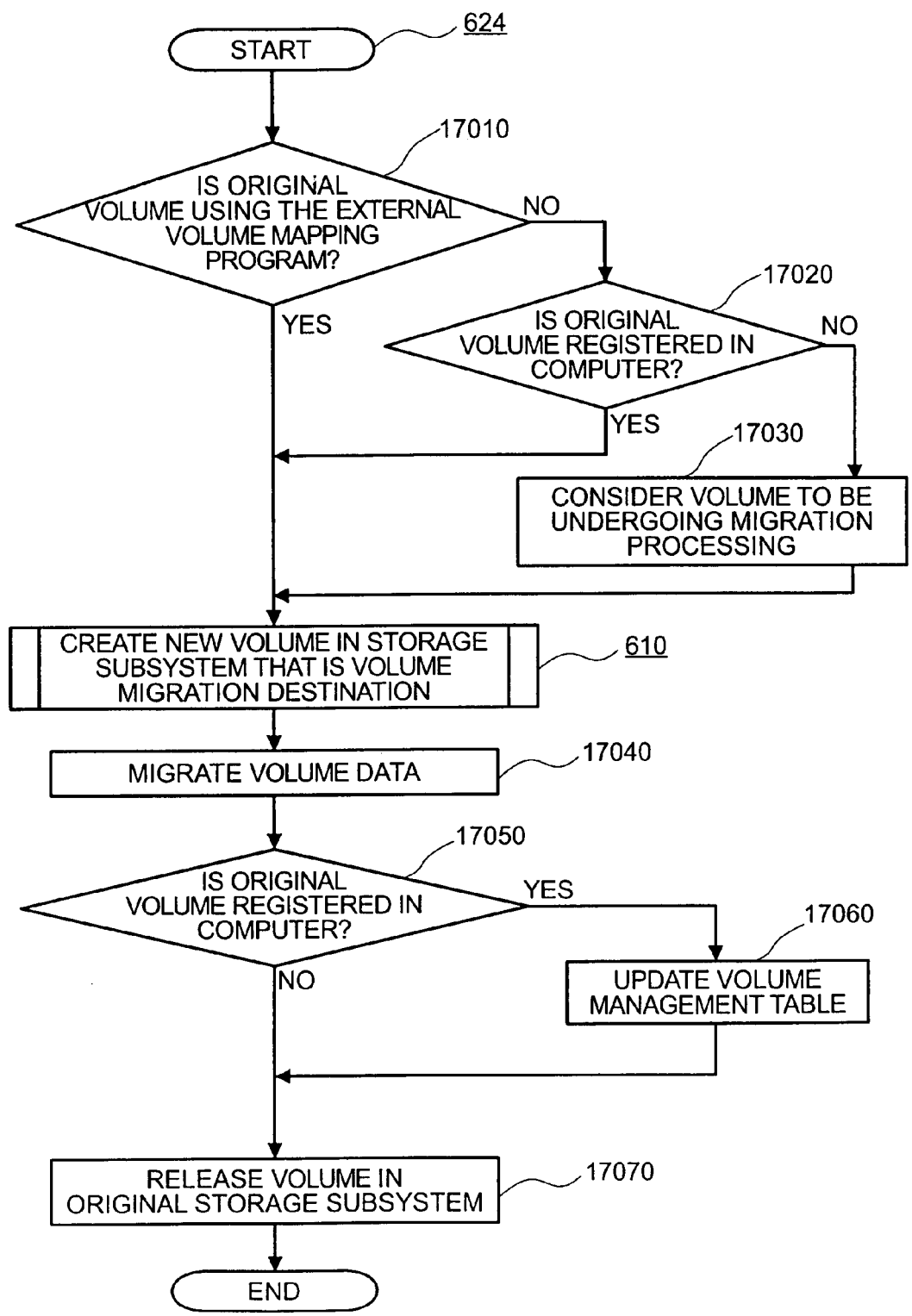
FIG. 17 is a flowchart representing a volume migration program executed by the management computer in accordance with an embodiment.

FIG. 17 shows a flowchart representing the volume migration program 624, which is executed by the management computer 600 after performing step 16100 of the volume evaluating program 622.

First, the management computer 600 judges whether or not the original volume is utilizing an external volume mapping program (step 17010). The external volume mapping program will be described below in connection with Embodiment 2. In the present embodiment, "NO" is assumed to be the result of the judgment performed here.

Next, the management computer 600 judges whether or not the original volume has been registered in the host computer (step 17020). Specifically, this judgment can be performed as follows: a volume management table request can be sent out over the management network, and then, from among all of the volume entries in the volume management tables from all of the host computers that provide responses, an entry can be extracted which has the same volume number as the volume number of the volume being migrated.

If there is a host computer using the volume at step 17020, then the management computer 600 gives instructions to all of the host computers where the volume being migrated is registered, so that the volume which is being migrated and which is in the volume management table in each host computer is changed to indicate that it is being migrated (step 17030). More specifically, a migration flag, which is in the volume management table 115 of the given host computer and which is used for the volume entry, is changed from "0" to "1". The host computer references the migration flag in the volume management table 115 each time it accesses the volume, and this suppresses access during the volume transfer processing.

In a case where the original volume was using the external volume mapping program at step 17010, and in a case where the original volume was not registered in the host computer at step 17020, and after step 17030 is performed, the management computer 600 creates a new volume in the storage subsystem where the volume will be migrated to. A detailed explanation of this step is omitted because it is similar to the volume creation program 610 described above.

After the new volume is created in the storage subsystem that was chosen as the volume transfer destination, the management computer 600 gives instructions to the volume migration means 700 to transfer the data of the volume (step 17040). The volume is generally a 512-byte block aggregate for storing data. Therefore, the management computer 600 has only to give to the volume migration means 700 the original storage subsystem and volume number and the destination storage subsystem and volume number, as parameters for the volume migration means 700. The volume migration means 700 uses the received parameters to copy the data between the first block and the last block in the volume of the original storage subsystem into the destination storage subsystem and volume. By way of example, the volume migration means of the present embodiment may be a program that is executed on an independent host computer for receiving the instruction parameters via the management computer 600 and the IP network 500, and this program may be executed to achieve copying between volumes via the fiber channel 200.

Similar to step 17010, the management computer 600 then searches to find out whether or not there is a host computer which is using the volume being migrated (step 17050). If a host computer is using the volume, then the management computer 600 gives instructions to that host computer to update its volume management table (step 17060). More specifically, from the volume information of the destination storage subsystem, the management computer 600 extracts a value representing the current destination volume's FC interface number, and a value representing the volume number. These values are used to rewrite the entry for drive letters where the migration flag is "1". Then the migration flag for the entry is changed from "1" back to "0".

Finally, the management computer 600 releases the volume in the original storage subsystem (step 17070). Specifically, instructions are given to the original storage subsystem to delete the original volume entry from the volume information.

The foregoing explanations have described the volume migration program 624.

Specific Example Employing Volume Evaluating Program 622

In order to provide a specific example of how to apply the volume evaluating program 622, a case will be described in which the storage subsystem 302 is added to the computer system, when the storage subsystem 301 has volumes 3411, 3412 in accordance with the present embodiment. By connecting the storage subsystem 302, the management computer 600 has two sets of storage subsystem characteristics 326, 327. Furthermore, the storage subsystem 302 does not have the volume already created inside it in its initial state.

First, by performing step 605, the management computer 600 obtains the system information from each of the storage subsystems connected to the management network 500. In the present embodiment, the information obtained from the storage subsystem 301 is the storage subsystem characteristics 326 shown in FIG. 4A, and the volume information 383 shown in FIG. 5B. On the other hand, the storage subsystem 302 has neither the storage subsystem characteristics 327 shown in FIG. 4B, nor a single volume. Therefore, the empty volume information 384 shown in FIG. 7A is obtained from it.

The management computer 600 then performs the evaluation from step 16020 to step 16130 on the volume written in the volume information. The present embodiment has two sets of volume information 383, 384. However, since the volume information 384 obtained from the storage subsystem 302 is empty, processing is performed on the volumes 3412, 3411 which are written in the volume information 383 that was obtained from the storage subsystem 301.

The management computer 600 first starts the reevaluation of the volume 3412, which is in the first line of the volume information 383. The first step of the reevaluation is to reference the value defined in the hint information AccessBandwidthHint for the volume 3412. The value defined for the AccessBandwidthHint is "10". The management computer 600 also references the bandwidth value defined for when the AccessBandwidthHint values for the storage subsystem characteristics 326 and the storage subsystem characteristics 327 are both "10" (step 16060). The bandwidth at the storage subsystem 301 is 2 Gbps, but the bandwidth at the storage subsystem 302 is 10 Gbps, which is highly accelerated. Therefore, since a high-performance volume can be provided (step 16070), the storage subsystem 302 is defined as the transfer destination candidate. The selected hint information is then considered complete (step 16090), and the evaluation of the volume is performed using the next hint information (step 16040).

Next, the value defined for the hint information StorageCostHint for the volume 3412 is referenced. Since the value for the StorageCostHint is "0", reevaluation does not need to be performed with respect to this hint.

Finally, the value defined for the hint information DataAvailabilityHint for the volume 3412 is referenced. The value for the DataAvailabilityHint is defined as "10". Then the management computer 600 references the availability value defined for when the values of the DataAvailabilityHint of the storage subsystem characteristics 326 and the storage subsystem characteristics 327 are both "10". The availability of the storage subsystem 301 is "99.9%", but the availability of the storage subsystem 302 is "99.999%". If the volume is migrated to the storage subsystem 302, then the availability can be improved. Since it is possible to provide a higher-performance volume (step 16060), the storage subsystem 302 is then defined as the transfer destination candidate. Then, the processing on the selected hint information is considered complete (step 16090), and all of the hit information in the volume information has been referenced, so that the evaluation of the volume ends.

The evaluation described above produces a judgment that the bandwidth and availability could be improved by migrating the volume 3412 from the storage subsystem 301 to the storage subsystem 302.

Therefore, the volume evaluating program 622 then advances to step 16100 and selects the storage subsystem 302 as the storage subsystem to transfer the volume to. At step 624, which is the volume migration program 624, the transfer of the volume is started. In order to transfer the volume 3412, the management computer 600 judges that the volume 3412 is not using the external volume mapping program, based on the volume information of the storage subsystem 301 and the storage subsystem 302. Furthermore, the management computer 600 obtains the volume management table 115 from the host computer 100 and determines that the host computer 100 is using the volume 3412. Therefore, an instruction is given to set the migration flag in the line for the volume 3412 in the volume management table 115 to "1", and thus the volume 3412 is considered to be in the process of getting migrated (FIG. 6C).

Next, the management computer 600 creates the volume creation request based on the hint and the capacity that were allocated to the volume 3412, and then emits this request to the storage subsystem 302. When the volume allocation program 330 for the storage subsystem 302 receives the volume creation request, it then prepares the requested 200-GB volume 3429. Since the AccessBandwidthHint is defined as "10", the volume information 384 is updated to look like FIG. 7B to allocate the unused 10-Gbps FC interface 3727. The volume that is created here has a bandwidth of 10 Gbps and a bit unit price of 2¢/MB, with 99.999% availability. When the creation of the volume 3429 in the storage subsystem 302 is complete, the management computer 600 instructs the volume migration means 700 to transfer the data inside the volume 3412 in the storage subsystem 301 to the volume 3429 in the storage subsystem 302. Once the data is completely copied into the volume 3429, the management computer 600 instructs the host computer 100 to update its volume management table 115, as shown in FIG. 6D (the migration flag gets returned to "0"). This causes the "C" drive of the host computer 100 to become the volume 3429 connected to the FC interface 3727 of the storage subsystem 302. Since the volume migration means 700 has transferred the data in the volume 3412 to the volume 3429, the host computer 100 can access the data without any changes to the volume 3412.

Finally, the management computer 600 emits a volume release request to the storage subsystem 301 to have the volume 3412 be considered unallocated. When the storage subsystem 301 receives the volume release request for the volume 3412, the volume information 383 is updated, as shown in FIG. 5C. Accordingly, the volume 3412 and the FC interface 3714 become free.

Next, the management computer 600 returns to step 16020 and starts reevaluating the volume 3411, which is in the second line of the volume information 383 shown in FIG. 6B (steps 16030-16040).

First, the management computer 600 references the hint information AccessBandwidthHint for the volume 3411. The value of the AccessBandwidthHint is "1". Then, the management computer 600 references the value defined for the bandwidth when "1" is the value of the AccessBandwidthHint for both the storage subsystem characteristics 326 and the storage subsystem characteristics 327 (step 16060). Here it is learned that both of the storage subsystems offer bandwidths of 1 Gbps (step 16070). Therefore, the storage subsystem 302 does not become a transfer destination candidate. The processing on the hint information is then considered complete (step 16090), and then the next hint value is referenced (step 16020).

Next, the management computer 600 references the value or the hint information StorageCostHint for the volume 3411. The value of the StorageCostHint is "10". The management computer 600 then references the value defined for the bit unit price when "10" is the value defined for the StorageCostHint in both the storage subsystem characteristics 326 and the storage subsystem characteristics 327. Thus, it is determined that the storage subsystem 301 has a bit unit price of 2¢/MB, and the storage subsystem 302 has a bit unit price of 1 ¢/MB. In other words, if the volume is moved to the storage subsystem 302, the bit unit price will rise, and so the storage subsystem 302 is not a transfer destination candidate. Finally, the value defined for the hint information DataAvailabilityHint for the volume 3411 is referenced. Since the DataAvailabilityHint value is "0", reevaluation is not necessary with respect to this hint.

By the foregoing evaluation, it has been determined that there is no transfer destination candidate for the volume 3411, and, therefore, there is no benefit in migrating the volume from the storage subsystem 301. Therefore, the management computer 600 does not transfer the volume 3411. Since there is no other volume entry to select, the processing of the volume evaluating program 622 ends.

As explained above, in the present embodiment, the storage subsystem 302 does not have the volume when it is in its initial state. However, even when the storage subsystem 302 has a volume, the processing can be performed as described above to reevaluate the volume inside the storage subsystem 302 and transfer the volume appropriately in accordance with the storage subsystem characteristics and the hint information.

Furthermore, as illustrated above, in the present embodiment, a reevaluation is performed when the new storage subsystem is added and the configuration collection program 605 detects the new storage subsystem. However, it is also possible to perform the reevaluation in a case where a new storage subsystem has not been added, but where a change has occurred in the system information of an existing storage subsystem. For example, the bit unit price can be changed when time has elapsed since purchase of the storage subsystem and the value of the host computer has depreciated. When this approach is taken, the storage subsystem characteristics can be changed automatically by the storage subsystem itself or by the administrator. The configuration collection program 605 can detect the change and execute the volume evaluating program 622 to transfer the volume where the StorageCostHint is prioritized to a volume with a less expensive unit cost.

Furthermore, at given chronological intervals, or when prompted by an input from a user, the management computer 600 can execute the configuration collection program 605 to obtain the system information.

The present embodiment was explained under the assumption that the storage subsystem possesses a discriminating program in advance. However, in a case where the storage subsystem does not posses storage subsystem characteristics, the administrator can use the management computer to prepare the storage subsystem characteristics for a given storage subsystem. When the administrator has created (or modified) the storage subsystem characteristics, the volume evaluating program 622 can be executed to perform a reevaluation of the volume as described in connection with the present embodiment.

Furthermore, in accordance with the present invention, the correspondence tables, such as shown in FIG. 4A and FIG. 4B are obtained from the storage subsystems 301, 302 in the same format. However, in actuality, if the storage subsystems are provided by different vendors, then it is conceivable that the storage subsystems will use different formats. In this case, a conversion program is made ready in the management computer to convert the formats of the correspondence tables, thus enabling the processing described in connection with the present embodiment.

Also, in accordance with the embodiment, at step 16020 of the volume evaluating program, the program is executed on the basis of the volume information of all the storage subsystems connected to the management computer via the network. However, the processing can also be performed on basis of the hint information for the volume information being held in just one or more of the storage subsystems.

Embodiment 2

(1) System Structure

FIG. 9 shows a system structure in accordance with Embodiment 2. Embodiment 2 will be explained with respect to a case where a storage subsystem 303 is added to the computer system having the storage subsystem 301.

The differences between the present embodiment and Embodiment 1 will be explained below.

A first difference is that, when the storage subsystem 303 is added in the present embodiment, the storage subsystem 301 is removed from the data network 200 and connected to the storage subsystem 303.

A second difference is that, in Embodiment 1, the volume migration means 700 was connected to the data network 200, but in the present embodiment the volume migration means 700 is provided within the storage subsystem 303.

A third difference concerns the structure of the management computer 600 shown in FIG. 12. The construction in the present embodiment uses the structure from Embodiment 1, but also includes a volume access switching program 630.

A fourth difference concerns the structure of the storage subsystem 303 which is added in the present embodiment. Detailed explanations will now be given below.

The storage subsystem 303 has FC interfaces 3731-3736 to connect with the storage subsystem 301. The FC interfaces 3731-3733 are 1 Gbps, and the FC interfaces 3734-3736 are 2 Gbps.

Furthermore, the storage subsystem 303 has a function whereby it can provide the volume in storage subsystem 301, which the storage subsystem 303 can recognize, to the host computer 100 through the FC interfaces 3731 to 3736, just as if it were the volume of the storage subsystem 303. This function is possible because the volume access control module 380 of the storage subsystem 303 has the volume information 385 shown in FIG. 10 to FIG. 10C. The volume information 385 shown in FIG. 10A to FIG. 10C is able to hold, in addition to the volume information as in Embodiment 1, the FC interface numbers and volume numbers of an external storage subsystem where the external volume is stored (this is the storage subsystem 301 in the present embodiment), while maintaining their correspondences with the volume information.

The storage subsystem 303 has three FC interfaces 3737-3739 for connection to the data network 200, which is connected to the host computer 100. The FC interfaces 3737 to 3739 are 10-Gbps FC interfaces.

The storage subsystem 303 also has an external volume mapping program 340 that is held in the memory 360.

The foregoing explanations illustrate the differences between Embodiment 2 and Embodiment 1.

In Embodiment 2, the storage subsystem characteristics held in the storage subsystem characteristics table 325 shown in FIG. 9 is such that the storage subsystem characteristics of the storage subsystem 301 corresponds to FIG. 4A, and the storage subsystem characteristics for the storage subsystem 303 corresponds to FIG. 4B. Other constructions of the storage subsystem 303, which are not touched upon in Embodiment 2, are similar to those of Embodiment 1, as already described with reference to FIG. 2.

(2) Volume Allocation Program Executed by Storage Subsystem

In the present embodiment, the volume allocation program executed by the storage subsystem is not different from that of Embodiment 1. Therefore, repeated explanations of this program are omitted.

(3) Details of Processing Performed by Management Computer 600

An explanation will now be given regarding details of the processing performed by the management computer 600, in accordance with the present embodiment. In the present embodiment, the management computer 600 executes processing in the following sequence. First, it performs processing to obtain the system information from the storage subsystem 301, and then performs processing to create the volume in the storage subsystem 301. Then, processing is performed to connect the newly configured storage subsystem 303 and the storage subsystem 301. Processing is also performed to detect the storage subsystem 303, and, finally, processing is performed to reevaluate and transfer the volume.

(3-1) Processing to Obtain System Information

In the present embodiment, the configuration collection program 605, which the management computer 600 uses to obtain the information about the storage subsystems, is similar to Embodiment 1. Therefore, an explanation of this program is omitted.

In the present embodiment as well, it is conceivable that only the storage subsystem 301 is connected at first, as in Embodiment 1. Therefore, when the management computer 600 executes the configuration collection program 605, the storage subsystem characteristics 326 are sent from the storage subsystem 301.

(3-2) Processing to Create Volume

In the present embodiment, the volume creation program 610, which the management computer 600 uses to create the volume, is similar to Embodiment 1. Therefore, an explanation of this program is omitted.

In the present embodiment as well, the management computer 600 is used to create the volume 3411 and the volume 3412 in the storage subsystem 301, as in Embodiment 1.

(3-3) Processing to Connect Storage Subsystem 301 and Storage Subsystem 303

As described above, in the present embodiment, if the storage subsystem 303 has been added to the system, then the processing to connect the storage subsystem 301 and the storage subsystem 303 becomes necessary. This connection processing is performed in the following sequence.

First, the interface connection between the storage subsystem 301 and the storage subsystem 303 is modified so that the storage subsystem 301 system information and volume can be obtained from the storage subsystem 303.

Then, the external volume mapping program 340 provided to the storage subsystem 303 is executed to enable the host computer 100 to use the volume in the storage subsystem 301 just as if it were the volume of the storage subsystem 303.

Finally, the volume access switching program 630 provided to the management computer 600 is executed to modify the configuration such that the host computer 100 can use the volume in the storage subsystem 303.

Details of each of these procedures will be explained below.

Modification of Connection to Storage Subsystem Interface

In the present embodiment, the storage subsystem 301 is removed from the data network 200 and then connected to the storage subsystem 303. The FC interfaces 3711-3713 of the storage subsystem 301 are connected to the FC interfaces 3731-3733 of the storage subsystem 303. The FC interfaces 3714-3716 of the storage subsystem 301 are connected to the FC interfaces 3734-3736 of the storage subsystem 303. In other words, FC interfaces with bandwidths of 1 Gbps are connected to each other, and FC interfaces with bandwidths of 2 Gbps are connected to each other, so that the FC interfaces with the same bandwidths are connected to each other. It is possible, however, to connect FC interfaces that have different bandwidths. In this case, operations are performed at the smaller bandwidth. Furthermore, the FC interfaces do not have to be connected directly to each other; they can be connected to each other via the data network 200.

The network interface 390 of the storage subsystem 303 is connected to the management network 500.

Execution of the External Volume Mapping Program 340

First, an explanation will be given regarding the flow of the external volume mapping program 340.

Figure 18:
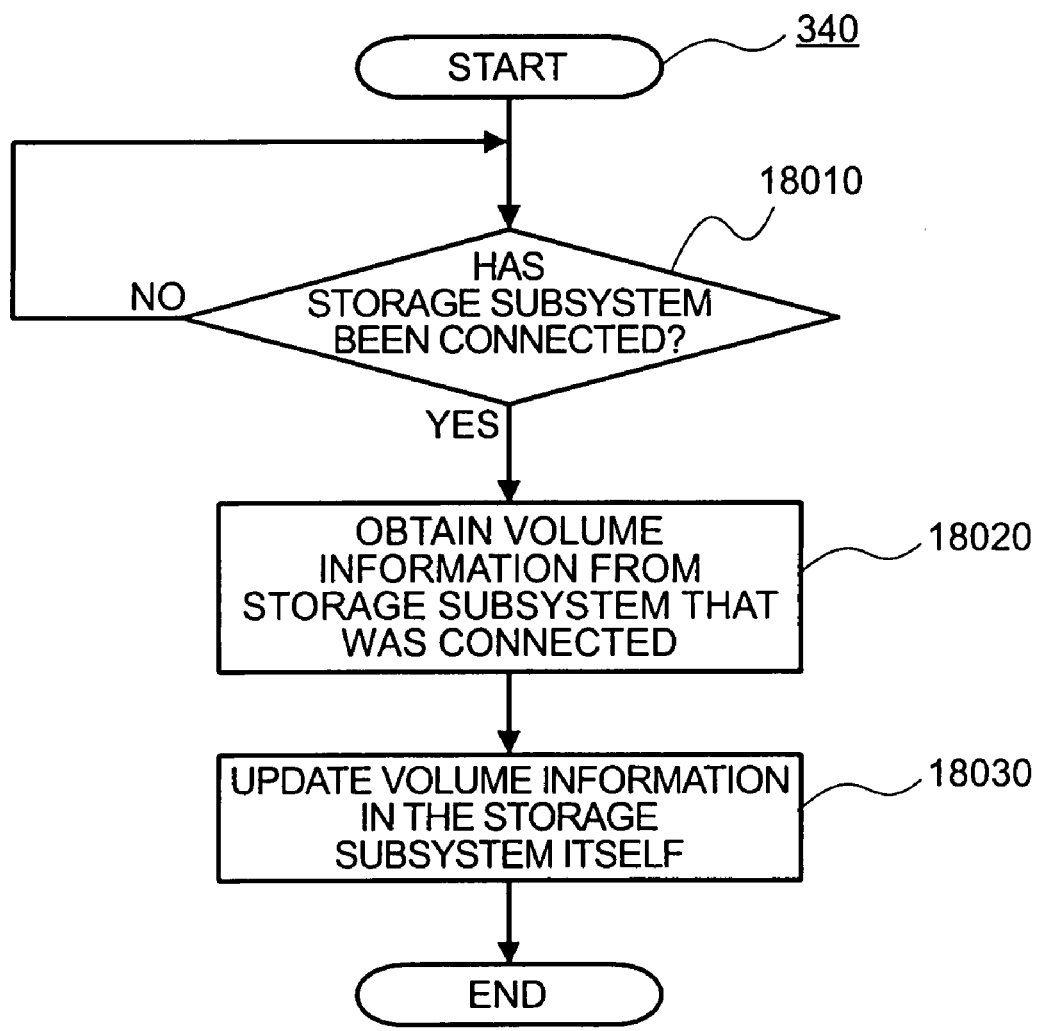
FIG. 18 is a flowchart representing an external volume mapping program executed by the third storage subsystem in accordance with Embodiment 2.

FIG. 18 shows the flow of the external volume mapping program 340 that is executed by the storage subsystem 303.

First, the storage subsystem 303 monitors the FC interfaces 3731-3736 at regular intervals to check whether a new storage subsystem has been connected (step 18010).

At step 18010, when a connection of a new storage subsystem is detected, the storage subsystem 303 then sends a request over the management network 500 to the storage subsystem that was connected and obtains the volume information of that new storage subsystem(step 18020).

Finally, the storage subsystem 303 uses the volume information obtained at step 18020 to update itself, i.e., the storage subsystem 303 (step 18030). More specific descriptions are provided below. The storage subsystem 303 may be configured to seek confirmation from the administrator before performing this updating processing, but the present embodiment does not seek confirmation from the administrator.

The foregoing explanations have described the external volume mapping program 340.

Next, an explanation will be given regarding application of this external volume mapping program 340 in accordance with the present embodiment.

After completing the modification of the interface connection between the storage subsystems, the storage subsystem 303 performs step 18010 to monitor the FC interfaces 3731-3736 at regular intervals to check whether the storage subsystem has been connected.

When it has been confirmed that the storage subsystem 301 has been connected, the storage subsystem 303 performs step 18020 to obtain the volume information 383 from the storage subsystem 301.

After obtaining the volume information from the storage subsystem 301, the storage subsystem 303 then performs the final step 18030 to update the volume information 385 that is stored in the storage subsystem 303 itself. Specifically, the volumes 3411, 3412 in the storage subsystem 301 are registered into the volume information 385 so they can be provided to the host computer 100 just as if they were volumes of the storage subsystem 303. FIG. 10A shows the volume information 385 after being updated by step 18030. In FIG. 10A the volume 3431 which is provided by the storage subsystem 303 is connected to the FC interface 3737. A capacity of 200 GB is shown, which is similar to FIG. 5A. In FIG. 10A, the actual source of the volume in the storage subsystem 303 is the same as in the external storage subsystem connected to the storage subsystem 303. It therefore holds information about the external storage subsystem. For example, in the case of the volume 3431, it is clear that what is being used as the actual source of the external volume is volume number 3411 in the storage subsystem 301, which is the external storage subsystem connected to the FC interface number 3711. Similarly, the volume 3432 being provided by the storage subsystem 303 is connected to the FC interface 3738, and its capacity is 200 GB. Furthermore, what is being used as the actual source of the external volume is volume number 3412 in the storage subsystem 301, which is the external storage subsystem connected to the FC interface 3714. In other words, the volume information 385 held in the storage subsystem 303 includes: the volume number inside the storage subsystem 303 itself; the capacity of that volume; the number and bandwidth of the FC interface connected to that volume; the hint information pertaining to that volume; the volume number of the external volume in the corresponding external storage subsystem; and the number of the FC interface connected to the external volume in the corresponding external storage subsystem.

Execution of the Volume Access Switching Program 630

First, the flow of the volume access switching program 630 will be explained.

Figure 19:
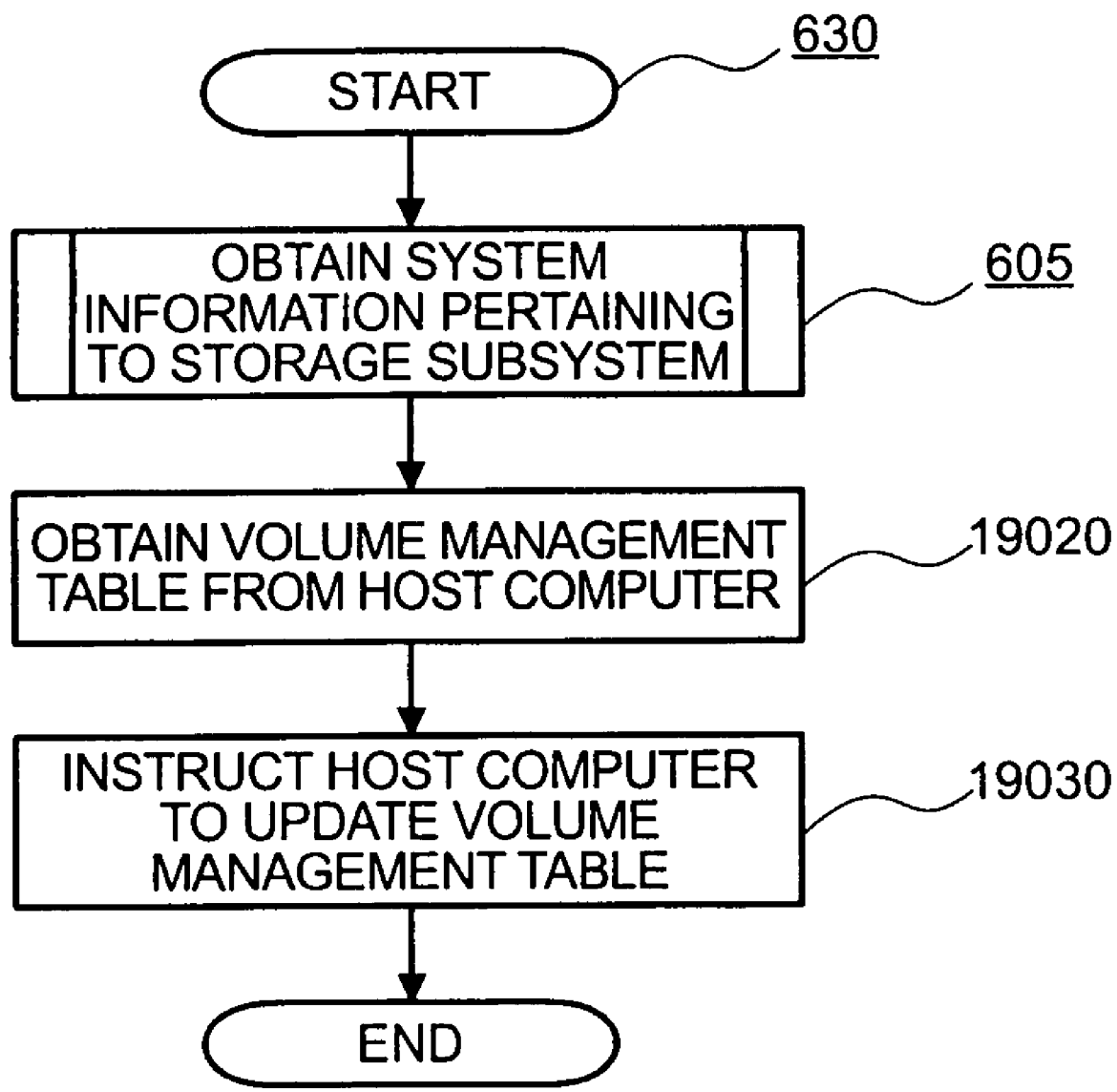
FIG. 19 is a flowchart representing a volume access switching program executed by the management computer in accordance with Embodiment 2.

FIG. 19 shows the flow of the volume access switching program 630, which is executed by the management computer 600.

First, the management computer 600 executes the configuration collection program 605 and obtains the volume information for the storage subsystem (step 605).

Then, a request for the volume management tables in the host computers is distributed over the management network 500, and the volume management table in each host computer is thus obtained (step 19020).

Finally, instructions are given to the host computers to update their volume management tables based on the volume information of the storage subsystems and the volume management tables from the host computers, which were obtained at step 605 and step 19020 described above (step 19030). Details of this step are described in the specific examples.

The foregoing explanations describe the volume access switching program 630.

Next, an explanation is given regarding application of this volume access switching program 630 in accordance with the present embodiment.

First, at step 605, the management computer 600 obtains the volume information from the storage subsystem 301 and the storage subsystem 303. More specifically, the volume information 383 shown in FIG. 5B is obtained from the storage subsystem 301, and the volume information 385 as shown in FIG. 10A is obtained from the storage subsystem 303.

Next, at step 19020 the management computer 600 obtains the volume management table from the host computer 100. Specifically, the volume management table 115 shown in FIG. 6B is obtained from the host computer 100.

Finally, at step 19030, the management computer 600 gives instructions to the host computer 100 to update the volume management table 115. More specifically, using the volume information and the volume management information in the volume management table 115 of the storage subsystem 301, the management computer 600 first learns that the host computer 100 was using the volume 3411 and the volume 3412 in the storage subsystem 301. Then, using the volume information from the storage subsystem 301 and from the storage subsystem 303, the management computer 600 learns that the content in the volume 3411 in the storage subsystem 301 is being provided from the storage subsystem 303 as the volume 3431, and that the content in the volume 3412 of the storage subsystem 301 is being provided from the storage subsystem 303 as volume 3432. Therefore, the management computer 600 gives an instruction to the host computer 100 to change the volume management table 115 from the content shown in FIG. 6B to the content shown in FIG. 11. Using the modified volume management table 115 shown in FIG. 11, the host computer 100 can continue using the content in the volume 3411 and in the volume 3412 of the storage subsystem 301 in the same fashion, just as if they were the volume 3431 and the volume 3432 in the storage subsystem 303.

(3-4) Processing to Detect New Storage Subsystem

In the present embodiment, the configuration collection program 605, which the management computer 600 uses to detect the storage subsystem 303, is similar to Embodiment 1. Therefore, an explanation of this program is omitted.

In the present embodiment as well, the management computer 600 detects the storage subsystem 303 and obtains the storage subsystem characteristics 327.

(3-5) Processing to Reevaluate and Transfer the Volume

Flow of Volume Reevaluation Program and Access Switching Program

In the present embodiment, the volume evaluating program 622, which the management computer 600 uses to reevaluate the volume, is similar to that of Embodiment 1. Therefore, an explanation of the flow of this program is omitted.

In the present embodiment, the volume migration program 624, which the management computer 600 uses to transfer the volume, is similar to that of Embodiment 1. However, one difference is that there is the possibility that at step 17010 the judgment will be made that the original volume is using the external volume mapping program of the storage subsystem 303. The following method can be used to make this judgment at step 17010: if the original volume is registered in the external storage subsystem field in the volume information for the storage subsystem 303, then it is judged that the original volume is using the external volume mapping program. Also, when judging whether or not the original volume using the volume mapping program is registered in the host computer, the volume number and the FC interface number are not read from the original volume, but rather they are read from the volume number and the FC interface number of the storage subsystem which has the external volume mapping program.

Below, explanations will be given regarding specific examples of the reevaluation and transfer of the volume 3412 and the volume 3411 in the storage subsystem 301.

Concrete Example 1 of Reevaluation and Transfer of Volume in Present Embodiment

The management computer 600 starts the reevaluation of the volume 3412, which is in the first line of the volume information 385 (step 16020).

First, the management computer 600 references the value of the hint information AccessBandwidthHint for the volume 3412. The value of the AccessBandwidthHint is "10".

Then, when the management computer 600 finds that "10" is the value defined for the AccessBandwidthHint of the storage subsystem 326 and the storage subsystem 327 from the storage subsystem 301 and the storage subsystem 303, it is clear that the storage subsystem 301 has a bandwidth of 2 Gbps, but the storage subsystem 303 has an accelerated bandwidth of 10 Gbps (step 16060).

Therefore, for the volume 3412 in the storage subsystem 301, instead of providing the external volume to the host as the external storage subsystem via the storage subsystem 303, the volume itself can be migrated to the storage subsystem 303 in order to fully capitalize on the 10-Gbps bandwidth (step 16060). Therefore, the storage subsystem 303 is specified as a transfer destination candidate. Then, the processing on the selected hint information is considered complete (step 16090), and the volume is evaluated with respect to the next hint (step 16040).

Then, the management computer 600 references the value defined for the hint information StorageCostHint for the volume 3412. The value in the StorageCostHint is "0". Therefore, the volume does not have to be reevaluated with respect to this hint information.

Finally, the management computer 600 references the value defined for the hint information DataAvailabilityHint for the volume 3412. The value for the DataAvailabilityHint is "10".

Next, the management computer 600 references the value defined for the availability in the case where "10" is defined for the DataAvailabilityHint values in the storage subsystem characteristics 326, 327 received from both the storage subsystem 301 and the storage subsystem 303. The availability for the storage subsystem 301 is "99.9%", but the availability for the storage subsystem 303 is "99.999%" (step 16060). By migrating the volume itself to the storage subsystem 303, the availability can be improved to provide a higher-performance volume (step 16070). Therefore, the storage subsystem 303 is determined as the transfer destination candidate. Then, the processing is considered complete for the selected hint information (step 16090), and all of the hint information in the volume information has been referenced. Therefore, the evaluation of the volume ends.

The foregoing evaluation produces a judgment that the bandwidth and the availability of the volume 3412 can be improved by migrating it from the storage subsystem 301 to the storage subsystem 303.

Therefore, the management computer 600 starts transferring the data. In the present embodiment, the processing from the evaluation to the transfer is executed without seeking confirmation from the administrator, however it is also possible to seek confirmation from the administrator as in Embodiment 1.

Once it is determined that the data for the volume 3412 will be moved from the storage subsystem 301 to the storage subsystem 303, the management computer 600 then executes the volume migration program 624.

Since the volume 3412 is using the external volume mapping program, the volume management table inside the host computer is not updated as in step 17030. Therefore, the volume management table in the host computer 100 remains as shown in FIG. 11 without being changed.

Next, in order to transfer the volume 3412, the management computer 600 creates the volume creation request based on the hint and the capacity allocated to the volume 3412, and then sends this request to the storage subsystem 303.

The storage subsystem 303 executes the volume allocation program 330 and prepares the 200-GB volume 3439 that was requested. Since no FC interface has been allocated to the volume 3439 at this point, "0" is allocated as the FC interface number (FIG. 10B). When the creation of the volume 3439 is complete, a notification of completion is sent from the storage subsystem 303 to the management computer.

The management computer 600 receives the notification from the storage subsystem 303 indicating that the creation of the volume is complete, and then gives instructions to the volume migration means 700 of the storage subsystem 303 to transfer the data in the volume 3412 to the volume 3439. The volume migration means 700 copies the first block through the last block of the volume 3412 into the volume 3439. In the present embodiment, the volume migration means is a program executed on the storage subsystem, and the program is executed to perform copying between volumes via the fiber channel 200.

When the copying into the volume 3439 is complete, the management computer 600 updates the volume information 385 for the storage subsystem 303 as shown in FIG. 10C. Here, the storage subsystem 303 allocates the FC interface 3738 to the newly created volume 3439, and changes the volume number to "3432". This eliminates the necessity in Embodiment 2 to rewrite the FC interface number and the volume number in the volume management table 115 of the host computer 100, which was necessary in Embodiment 1 when performing a transfer.

Finally, the management computer 600 executes the volume release program 612 to cause the volume 3412 in the storage subsystem 301 to become unallocated.

This completes the reevaluation of the volume 3412 and the volume transfer processing which is performed based on the evaluation.

Concrete Example 2 of Reevaluation and Transfer of Volume in Present Embodiment

Next, the management computer 600 begins reevaluation of the volume 3411, which is in the second line of the volume 385.

First, the management computer 600 references the value defined for the hint information AccessBandwidthHint for the volume 3411. The value of the AccessBandwidthHint is "1". Then, the management computer 600 references the value for when "10" is defined for the value of the AccessBandwidthHint of both the storage subsystem characteristics 326 and the storage subsystem characteristics 327, which were received from the storage subsystem 301 and the storage subsystem 303. This clarifies that both of the storage subsystems have bandwidths of 1 Gbps. Therefore, it is not necessary to transfer the volume.

Next, the management computer 600 references the value defined for the hint information StorageCostHint for the volume 3411. The value defined for the StorageCostHint is "10". Then, the management computer 600 references the bit unit price for when "10" is defined as the value of the StorageCostHint in both the storage subsystem characteristics 326 and the storage subsystem characteristics 327, which were received from the storage subsystem 301 and the storage subsystem 303. The bit unit price for the storage subsystem 301 is 2¢/MB, and the bit unit price for the storage subsystem 303 is 1 ¢/MB. Therefore, if the volume is migrated to the storage subsystem 303, the bit unit price will rise, and so there is no advantage in migrating the volume.

Finally, the management computer 600 references the value defined for the hint information DataAvailabilityHint for the volume 3411. Since the value of the DataAvailabilityHint is "0", the reevaluation is not necessary with respect to this hint.

The foregoing evaluation produces a determination that there is no advantage or benefit in migrating the volume 3411 from the storage subsystem 301 to the storage subsystem 303.

Therefore, the management computer 600 does not execute the volume migration program 624 to transfer the volume 3411.

Embodiment 2 has been explained here as having the management computer 600, similar to Embodiment 1. However, the programs which were provided in the management computer 600 in Embodiment 2 can also be provided to the storage subsystem 303. These include: the configuration collection program 605; the volume creation program 610; the volume release program 612; the volume information obtaining program 620; the volume evaluating program 622; and the volume migration program 624.

This configuration enables the storage subsystem 303 to check the FC interfaces 3731-3736 regularly and to execute the sequence of procedures to perform the reevaluation when the connection of the new storage subsystem is detected.

Moreover, this reduces the burden on the network between the management computer and the storage subsystem 303.

Finally, an explanation will be given regarding the volume migration means 700, which is used in Embodiment 1 and Embodiment 2.

Figure 20:
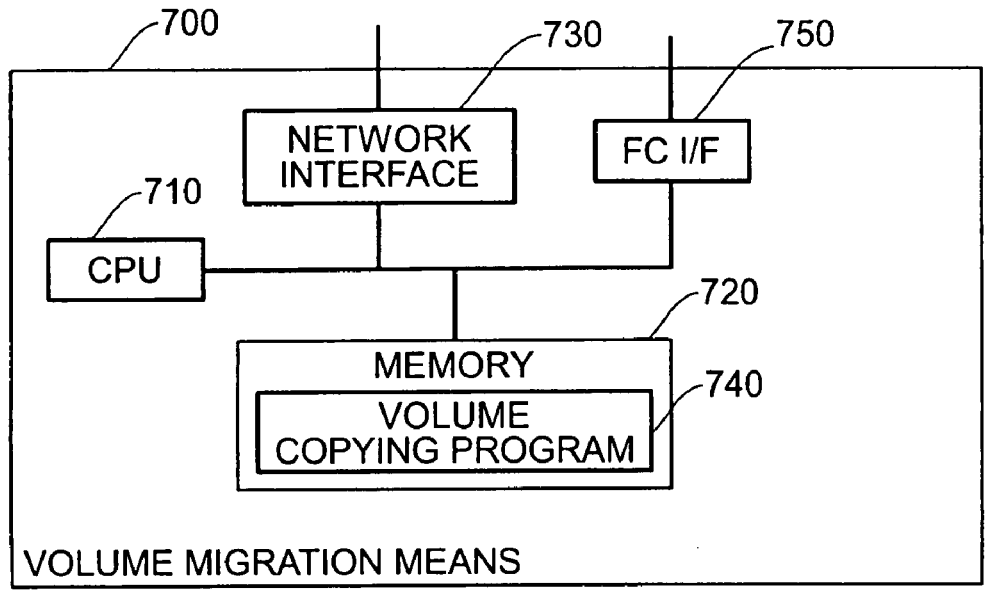
FIG. 20 is a diagram showing the hardware structure of volume migration means in accordance with an embodiment.

FIG. 20 shows a hardware structure diagram of the volume migration means 700 shown in FIG. 1. The volume migration means 700 has: a CPU 710 for governing execution of the program; a memory 720 for storing the program and data necessary to execute the program; a network interface 730 connected to the management network for sending and receiving data to and from the management computer 600; and a FC interface 750 for sending and receiving data to and from the storage subsystem(s). The memory 720 stores the volume copy program 740, which the volume migration means 700 executes in accordance with instructions from the management computer 600.

Figure 21:
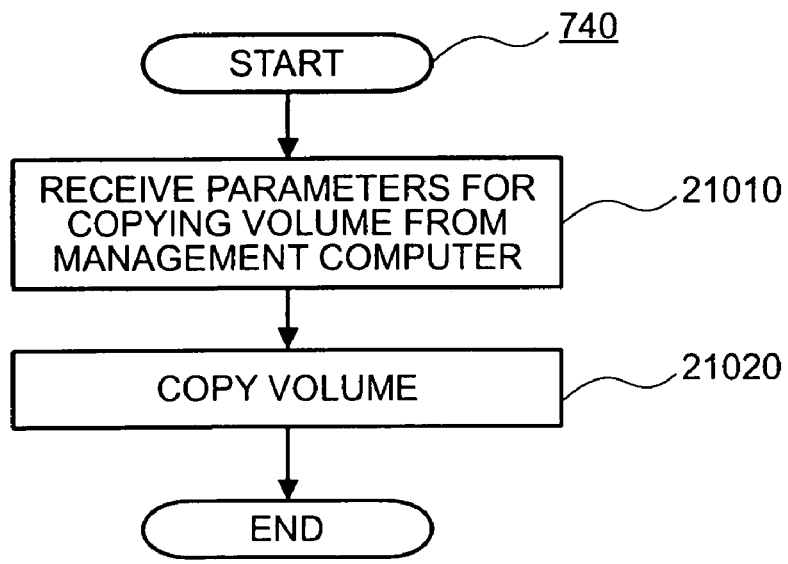
FIG. 21 is a flowchart representing a volume copy program executed by the volume migration means in accordance with an embodiment.

FIG. 21 shows the flow of the volume copy program 740 that is executed by the volume migration means 700 shown in FIG. 1. The CPU 710 of the volume migration means 700 executes the volume copy program 740 stored in the memory 720.

First, the volume migration means 700 receives the original storage subsystem and volume number, and the destination storage subsystem and the volume number, from the management computer 600 as parameters for copying the volume (step 21010).

Based on the parameters received at step 21010, the CPU 710 in the volume migration means 700 copies the first block through the last block in the original storage subsystem, into the destination storage subsystem and volume, via the data network (step 21020).

More specifically, the CPU 710 first sends an SCSI "read" command through the FC interface 750 to the volume in the original storage subsystem, which is indicated in the parameters received at step 21010, and then reads the data from a block in the corresponding volume. Then, together with the data that is read here, the CPU 710 sends an SCSI "write" command through the FC interface 750 to the corresponding block in the volume of the destination storage subsystem, which is indicated in the parameters. When the destination storage subsystem receives the "write" command it writes the data into the corresponding volume block. The processing of the "read" command and the "write" command simply needs to be repeated from the first block to the last block in the volume. The volume migration means 700 can store the data that is read here into the memory 720, and it can read this data from the memory and send it together with the "write" command to the destination storage subsystem.

Although not represented in FIG. 21, when the CPU 710 executes step 21020, it first confirms that the original storage subsystem and volume and destination storage subsystem and volume are accessible from the FC interface 750. If they are not accessible, then the volume copy program 740 is cancelled and a notification is sent to the management computer 600 to indicate that access cannot be achieved. When the management computer 600 receives the notification it displays a warning on the display 680 to the administrator urging him or her to change the settings to enable access.

After the setting changes are performed, the administrator uses the keyboard 682 and mouse 684 or other input to give an instruction, and, in response to this, the management computer 600 instructs the volume migration means 700 to restart the volume copy program 740.

In the computer system shown in FIG. 2 in accordance with Embodiment 1, the volume migration means 700 is constituted by hardware which is independent and different from the storage subsystem 301, the storage subsystem 302, the host computer 100, and the management computer 600. This reduces the processing burden placed on the devices including the storage subsystem, the host computer, and the management computer, particularly the management computer 600.

However, it is also possible to adopt a construction in which the volume copy program 740 is provided to either the storage subsystem 301, the storage subsystem 302, the host computer 100 or the management computer 600, and that device executes the volume copy program 740, thereby achieving a construction in which the computer system does not include the volume migration means 700 as an external device, such as shown in FIG. 20. If the volume copy program 740 is executed by the CPU 650 of the management computer 600, then the management computer 600 will have an FC interface (not shown in FIG. 9) for sending and receiving data to and from the storage subsystem over the data network, and this CPU 650 will perform the processing shown in FIG. 21.

Furthermore, in the computer system shown in FIG. 9 according to Embodiment 2, the volume migration means 700 is provided inside the storage subsystem 303. However, the volume migration means 700 can be provided to either the storage subsystem 301, the host computer 100 or the management computer 600, either as software or as a hardware construction. The volume migration means 700 can also be an external device having an independent hardware construction.

The various embodiments described above alleviate the burden of resource administration for the administrator of a large storage system, in which multiple storage subsystems connected over a network have large amounts of storage volume allocated to them. For example, the burden of determining how to transfer volume (volume) and other administrative burdens is reduced.

Furthermore, volumes can be reevaluated. This reevaluation can be performed based not only on maximum usage times (usage rates) determined for each storage subsystem individually and various types of access made to the volumes, but also based on information which cannot be obtained by measuring factors in real time, such as the reliability and/or cost of the volume. Namely, the reevaluation of the volumes can also be performed based on the "hints", which are allocated to the volumes in advance and cannot be measured in real time.

In a SAN or other computer system with multiple storage subsystems, the embodiments described in the present specification can provide a method of detecting the addition of a storage subsystem or structural changes to storage subsystems on the SAN, to redistribute existing volumes based on the "hints" given when the volumes are made, so as to manage the distribution of the volume so that resources are utilized effectively.

What is claimed is:

1. A method of managing volumes of a plurality of storage systems coupled to a management computer via a first network, the plurality of storage systems having volumes provided to a computer via a second network and storing data used by the computer, the plurality of storage systems including a first storage system and a second storage system, the method comprising the steps of:

keeping a first characteristic table in said first storage system and a second characteristic table in said second storage system, the first characteristic table indicating a correspondence between a plurality of hint values and a plurality of characteristic values of volumes included in said first storage system, the second characteristic table indicating a correspondence between a plurality of hint values and a plurality of characteristic values of volumes included in said second storage system;

obtaining from said first storage system a first hint value related to a first volume included in said first storage system when one or more of said characteristic values of said first characteristic table or one or more of said characteristic values of said second characteristic table are changed;

referring by the management computer to a first characteristic value corresponding to said first hint value, the first characteristic value included in said first characteristic table and to a second characteristic value corresponding to said first hint value, the second characteristic value included in said second characteristic table;

comparing said first characteristic value and second characteristic value; and migrating data from said first volume to a second volume included in said second storage system if said second characteristic value is more desirable than said first characteristic value for said first hint value as a result of the comparison.

2. The method according to claim 1, wherein said plurality of characteristic values of said first characteristic table and said plurality of characteristic values of said second characteristic table are values of Access bandwidth, values of Storage Cost or values of Data availability.

3. The method according to claim 1, wherein said plurality of hint values of said first characteristic table are input based on policies each specifying a predetermined hint value.

4. The method according to claim 1, further comprising the step of:

releasing said first volume after migrating data from said first volume to said second volume.

5. A computer system comprising:

a management computer; and a plurality of storage systems coupled to the management computer via a first network, wherein the plurality of storage systems include volumes provided to a computer via a second network and store data used by the computer, the plurality of storage systems including a first storage system and a second storage system, wherein a first characteristic table is held in said first storage system and a second characteristic table is held in said second storage system, the first characteristic table indicating a correspondence between a plurality of hint values and a plurality of characteristic values of volumes included in said first storage system, and the second characteristic table indicating a correspondence between a plurality of hint values and a plurality of characteristic values of volumes included in said second storage system, wherein the management computer obtains from said first storage system a first hint value related to a first volume included in said first storage system when one or more of said characteristic values of said first characteristic table or one or more of said characteristic values of said second characteristic table are changed, refers to a first characteristic value corresponding to said first hint value, the first characteristic value included in said first characteristic table and to a second characteristic value corresponding to said first hint value, the second characteristic value included in said second characteristic table and compares said first characteristic value and second characteristic value, and wherein data is migrated from said first volume to a second volume included in said second storage system if said second characteristic value is more desirable than said first characteristic value for said first hint value as a result of the comparison.

6. The computer system according to claim 5, wherein said plurality of characteristic values of said first characteristic table and said plurality of characteristic values of said second characteristic table are values of Access bandwidth, values of Storage Cost or values of Data availability.

7. The computer system according to claim 5, wherein said plurality of hint values of said first characteristic table are input based on policies each specifying a predetermined hint value.

8. The computer system according to claim 5, wherein the management computer releases said first volume after migrating data from said first volume to said second volume.

* * * * *